TELEPHONE SUBSCRIBER'S INDIVIDUAL SWITCHES OPERATED IN HUNTING OPERATIONS ON BOTH INCOMING AND OUTGOING CALLS TO COMPLETE CONNECTIONS

Filed May 3, 1945

6 Sheets-Sheet 1

INVENTOR
CLARENCE MARBLE

BY [signature]

ATTORNEY

May 23, 1950 C. MARBLE 2,508,646

TELEPHONE SUBSCRIBER'S INDIVIDUAL SWITCHES OPERATED IN HUNTING OPERATIONS ON BOTH INCOMING AND OUTGOING CALLS TO COMPLETE CONNECTIONS

Filed May 3, 1945 6 Sheets-Sheet 2

INVENTOR.
CLARENCE MARBLE

BY

Chas. W. Candy

ATTORNEY

TELEPHONE SUBSCRIBER'S INDIVIDUAL SWITCHES OPERATED IN HUNTING OPERATIONS ON BOTH INCOMING AND OUTGOING CALLS TO COMPLETE CONNECTIONS

Filed May 3, 1945 6 Sheets-Sheet 3

INVENTOR
CLARENCE MARBLE
BY [signature]
ATTORNEY

May 23, 1950 C. MARBLE 2,508,646

TELEPHONE SUBSCRIBER'S INDIVIDUAL SWITCHES OPERATED IN HUNTING OPERATIONS ON BOTH INCOMING AND OUTGOING CALLS TO COMPLETE CONNECTIONS

Filed May 3, 1945 6 Sheets-Sheet 4

INVENTOR.
CLARENCE MARBLE
BY
Chas. W. Candy
ATTORNEY

TELEPHONE SUBSCRIBER'S INDIVIDUAL SWITCHES OPERATED IN HUNTING OPERATIONS ON BOTH INCOMING AND OUTGOING CALLS TO COMPLETE CONNECTIONS

Filed May 3, 1945

INVENTOR
CLARENCE MARBLE

BY Chas. W. Canty

ATTORNEY

TELEPHONE SUBSCRIBER'S INDIVIDUAL SWITCHES OPERATED IN HUNTING OPERATIONS ON BOTH INCOMING AND OUTGOING CALLS TO COMPLETE CONNECTIONS

Filed May 3, 1945

6 Sheets-Sheet 6

INVENTOR.
CLARENCE MARBLE

BY Chas. W. Cardy

ATTORNEY

Patented May 23, 1950

2,508,646

UNITED STATES PATENT OFFICE 2,508,646

TELEPHONE SUBSCRIBER'S INDIVIDUAL SWITCHES OPERATED IN HUNTING OPERATIONS ON BOTH INCOMING AND OUTGOING CALLS TO COMPLETE CONNECTIONS

Clarence Marble, Middlesex, N. Y.

Application May 3, 1945, Serial No. 591,703

40 Claims. (Cl. 179—22)

My invention relates to improvements in automatic switching systems for telephone and other communications equipment whereby a dial of the type now in common use in telephony is employed to activate receptive apparatus of a system in the selection, connection and control of its various elements, units or lines.

The objects of my invention are: first, to provide an automatic switching system which will employ a lesser number of operating elements, occupy less space, require less wire, require less maintenance labor and cost less than any other automatic switching system with an equal number of elements to be connected together and with the same operating features; second, to provide all of the operating features now in common use in the operation of automatic switching systems such as dial tone, reverting ringing tone, busy tone, a central source of power and automatic ringing; third, to provide selector equipment in which the dialing operations at calling telephone apparatus or similar pulsings established by other means, will, in one piece of apparatus, set up a circuit network so arranged that only a desired element, unit or line, of the system will respond; fourth, to provide in one piece of apparatus, individual to each element unit or line of the system, functions making this piece of apparatus responsive as the calling or as the called member according to its status in a connection; fifth, to provide equipment to which the calling and called members are attached for the duration of a connection and without interference with other connections; sixth, to provide equipment which will accompany the called member to its point of connection with the calling member and control the establishment of the connection; seventh, to provide equipment for the timing of connections and to prevent interference when two or more connections are in preparation at the same time; eighth, to provide for the registration of delayed connections; ninth, to provide an audible signal which will announce failure of the apparatus to complete a connection; tenth, to provide visual indication of a piece of apparatus which fails to complete a connection; eleventh, to provide features which will prevent the simultaneous connection of two or more calling elements, units or lines at the same instant and subsequent confliction; twelfth, to provide features which will permit two or more elements, units or lines to employ the same call number and respond accordingly as required for telephone private branch exchange trunks; thirteenth, when employed in connecting two telephones to provide a talking circuit which is held clear of all operational equipment except the windings of the usual battery supply coils; fourteenth, to provide a grade of telephone line in this system adaptable to the various auxiliary circuits and apparatus normal to a major size telephone central office; fifteenth, to provide facilities for selective ringing on party lines.

Heretofore automatic switching systems have been used for the connection of telephone lines whereby a subscriber desiring a certain line could be connected by a sequence of operations thru limited channels, established by relays or switches in accordance with each dialing operation. To better explain, it is common practice in major size telephone offices using switching systems now available, to direct incoming calls thru successive channels to desired thousands and hundreds groups then to the final unit associated with a desired line. With such systems, if the prescribed maximum load for the established channel has been met, subsequent calls directed into a channel when its maximum load has been attained are denied facilities and the call is lost or delayed. In any telephone system any group of lines, 100 for instance, may have a high percentage of its lines in use, say 25%, yet the system as a whole may, at the same time and under maximum load, have but 3 to 5 percent of its lines in use. This invention establishes all lines in a system at the same status as part of one group consisting of the total number of lines in the system therefore apparatus need be provided only to meet the 3 to 5 percent of simultaneous connections or whatever percentage of connections average holding time and calling rate a given telephone system as a whole would warrant. In addition, automatic systems heretofore have established a talking channel from the calling line thru a series of various equipments or relay combinations to the called line necessitating installation of equipment sufficiently large to accommodate talking facilities together with selecting and control facilities throughout the system. With the present invention the called line is reached by a selector employing only signaling wires. To more clearly present this contrast, heretofore a system consisting of ten thousand terminations required a minimum of thirty thousand wires between switches or other apparatus used to select called lines and the called line equipment. With this invention but two hundred wires are required for the same purpose in a ten thousand line system. To further contrast the advantages of this invention with automatic systems heretofore developed it is pointed out that regardless of the size of the system, no train consisting of a plurality of selectors and connectors or large groups of relays is required to establish a connection between the calling and called telephones of the system. When the calling line is activated it engages a selector which in turn activates and connects the called line to the calling line in accordance with the calling lines controlling operations.

This invention includes controls to prevent two or more incoming calls from arriving at the same instant and connecting simultaneously to the same selector equipment but other than that protective feature each call is established independently and is not effected by the calling operations of any other line. On completion of dialing a call might be delayed slightly awaiting connection or busy report but this delay would not be due to the action of any other line in establishing its connection.

A clearer conception of the scope and purpose of the invention will be obtained from the following description taken in connection with the attached drawings in which.

Figures 5, 8:
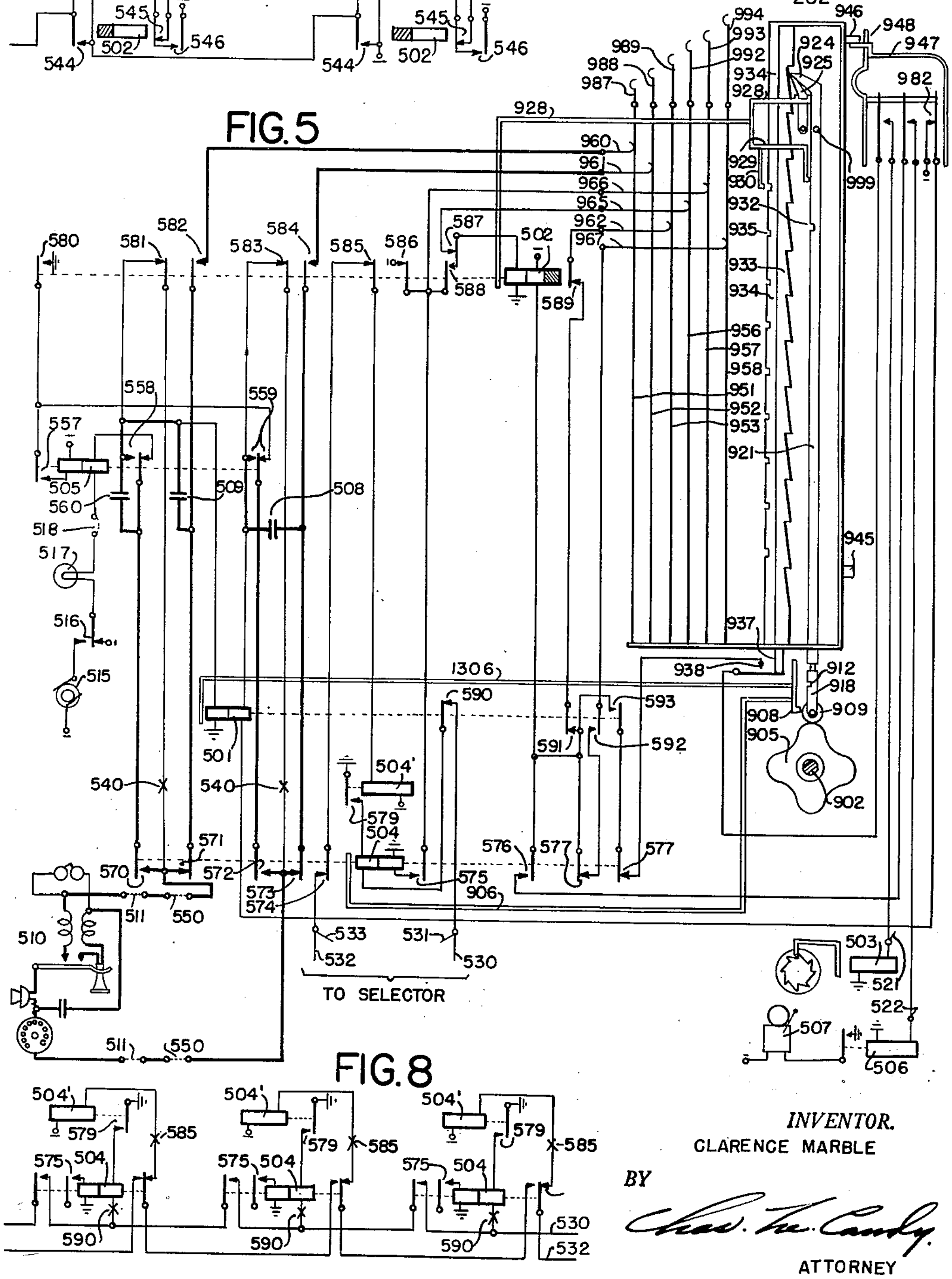

Fig. 5 is a schematic diagram of the line circuits and presents the electrical features employed by any line in either the calling or answering operations. Mechanical features essential in the description of the circuit features are also presented. A dial telephone and ringing generator equipment are also shown to facilitate descriptions. Registration and alarm circuits are shown together with the tripping mechanism which activates them.

Figure 6:
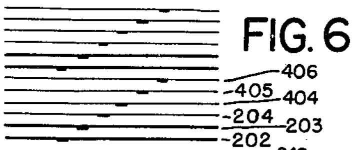

Fig. 6 represents the appearance of two selector circuits and their contact lugs at a line equipment.

Figure 7:
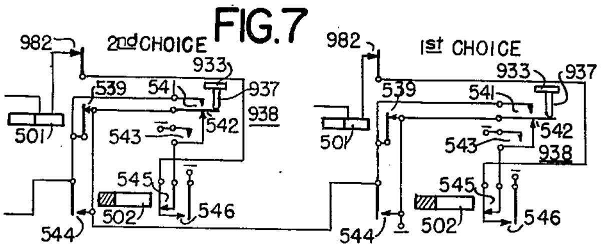

Fig. 7 is a schematic diagram of circuit features to be added to the line circuits to control the sequence in which lines calling in at the same instant are accepted.

Fig. 8 is a schematic diagram of circuit features to be added to the line circuits where two or more lines employ the same call number as in private branch exchange trunks.

Figures 9, 10, 11, 12, 13, 14:
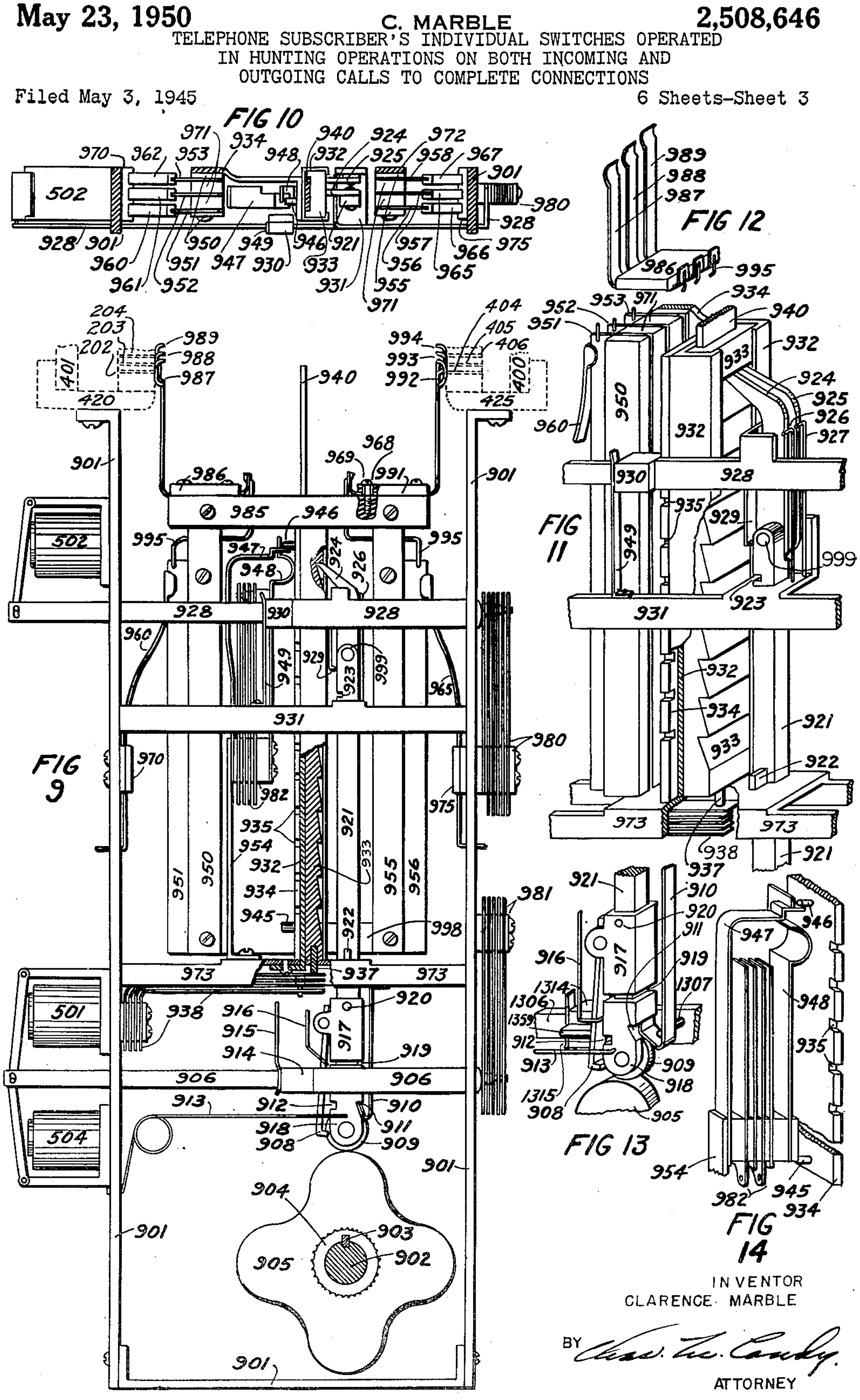

Fig. 9 is an elevation view showing the essential mechanical details of a typical line unit. Dotted lines indicate its relationship to the selector contact multiple and supporting iron work.

Fig. 10 is a plan view of a line unit in section immediately below the upper cross piece 935 and shows the relative arrangement of the various pieces of apparatus comprising the unit.

Fig. 11 is an isometric view of one side of the operating arm of the line unit and is provided to more clearly present the operating and locking functions of the unit.

Fig. 12 is an isometric view showing the relative arrangement of contact fingers on one side of the line unit operating arm.

Fig. 13 is an isometric view showing the mechanism employed to activate an operating arm for propulsion by a continuously revolving eccentric wheel.

Fig. 14 is a schematic view showing the arrangement of the tripping mechanism employed to return the line units when their operating limit has been reached.

Figure 15:
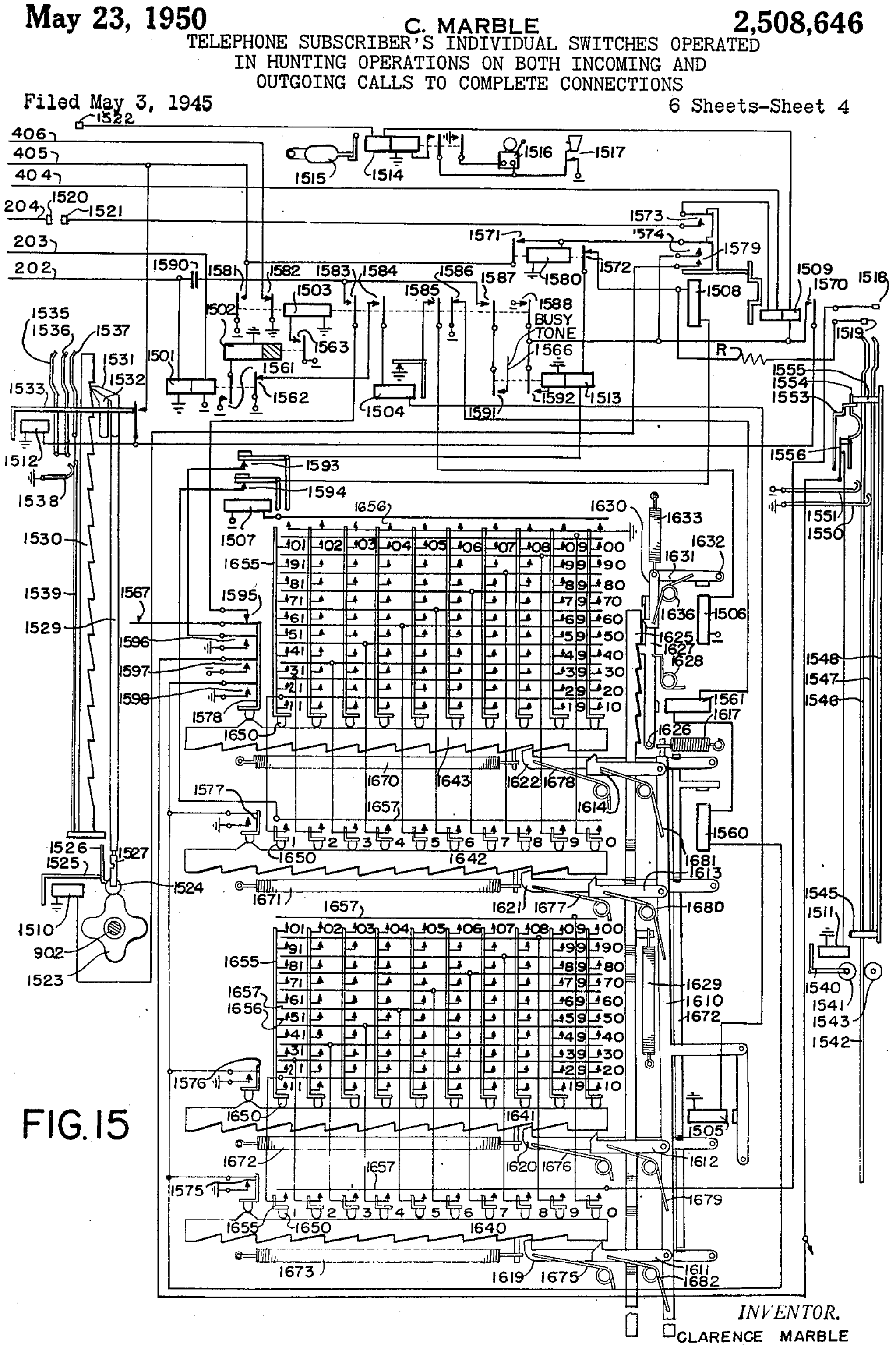

Fig. 15 is a schematic diagram of the selector circuits and includes representation of sufficient mechanical features to clarify its description.

Figures 16, 17, 18, 19, 20:
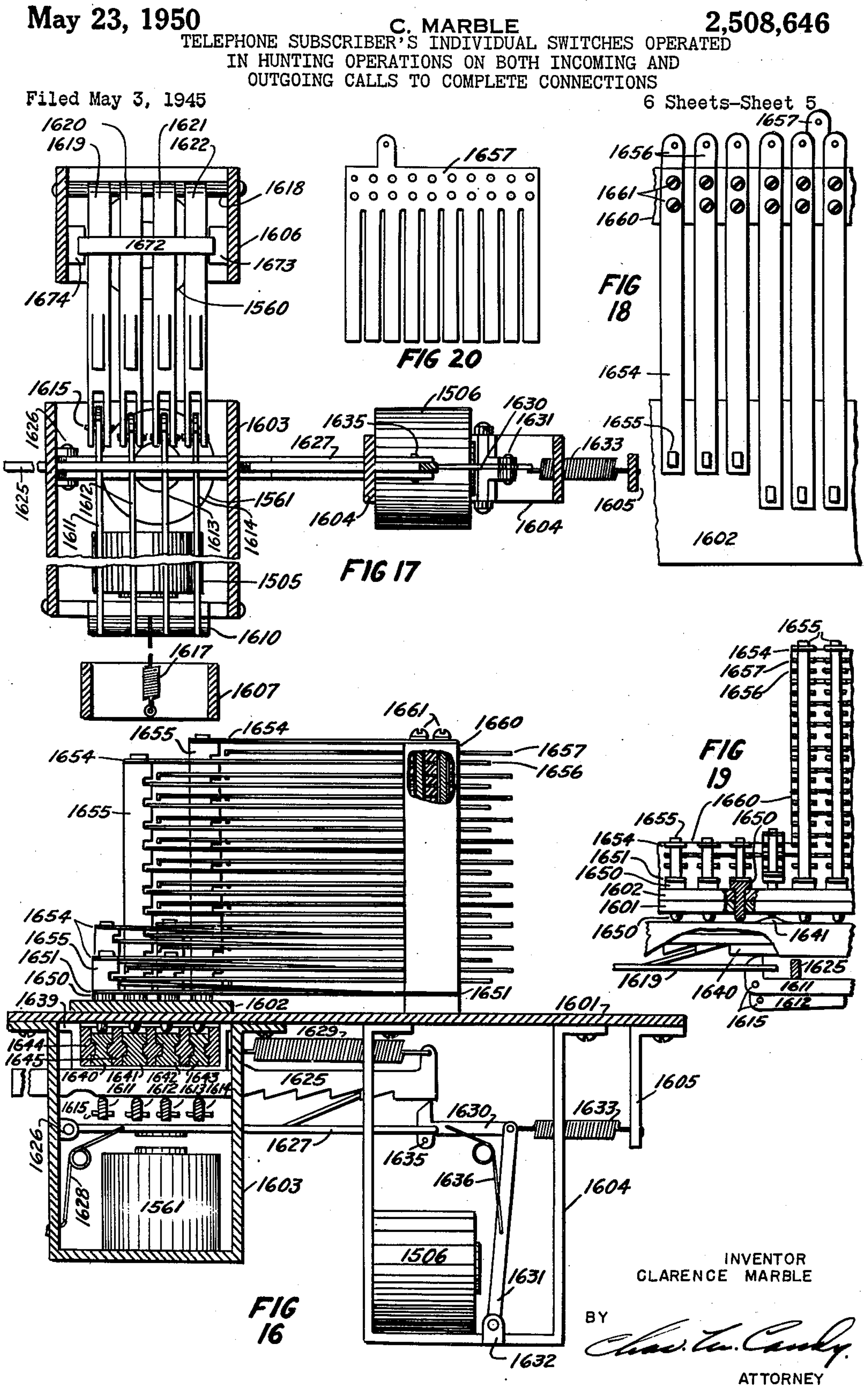

Fig. 16 is a combined end view and partial section of the line pattern selector switch.

Fig. 17 is a plan view, in section, showing part of the operating mechanism of the line pattern selector switch.

Fig. 18 is a partial plan view showing the relative arrangement of contacts in the line pattern selector switch.

Fig. 19 is a partial end view and section of the "hundreds" and "tens" contact banks and show their relation to operating mechanism.

Fig. 20 is a plan view of a stamping which will provide the common contact springs for each horizontal row of selector pattern contacts.

Figures 21, 22, 23:
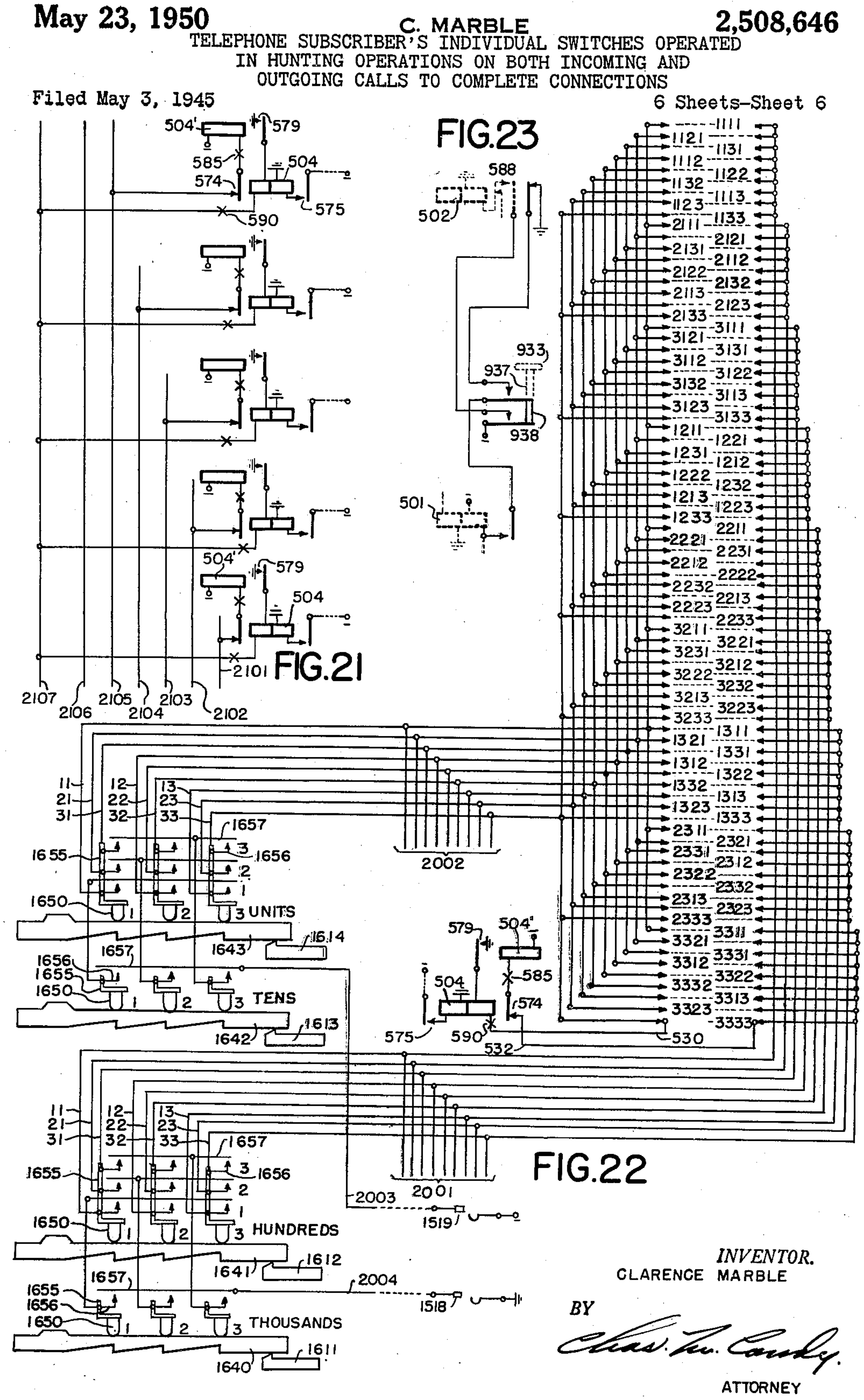

Fig. 21 indicates wiring required between selectors and line equipments in a ten thousand line system using the principle illustrated in Fig. 22.

Fig. 22 is a functional diagram showing the essential features of the principle employed in establishing patterns for the selection of various lines in an eighty-one line system.

Fig. 23 is a schematic diagram of disconnect control features of the line equipment unit.

*General description of this invention*

Any subscriber of a telephone system embodying this invention upon lifting the hand set or receiver of his dial telephone activates line equipment associated with, and individual to his line. This equipment consists principally of five relays, and an operating mechanism. Two of the five relays function when the line is calling and four of the five relays function when the line is being called (answering). The operating mechanism functions when the line is either calling or answering. The operating mechanism consists principally of a frame to which an arm carrying six finger-like contacts, or wipers, are attached. Its motion is impelled by a ratcheting shaft which is activated by operation of certain relays and engagement with a continuously revolving eccentric or cam individual to each line equipment. The line equipment includes a holding mechanism consisting of a pin-like device which engages a slot in the moveable arm on operation of a holding relay when required. Each line equipment also includes three condensers for battery supply control and reverting ringing tone; terminals not shown on the drawings for connection of the outside line extending to the subscribers telephone and for connection of ringing current and positive and negative battery; a tripping mechanism to reverse the direction of movement of the operating arm when used for calling or to sound an alarm as necessary when activated for answering. The six finger-like contacts, or wipers, carry three circuits. Two of the contacts carry the talking and pulsing circuit; two are used for a circuit which selects and holds idle selector equipment and the other two carry a circuit for connecting and holding the called line onto the selector circuit when the called line is activated.

As the operating arm of the line equipment progresses its contact fingers engage various stationary contacts or lugs arranged in groups of six. Three of these stationary contacts are in a tier on each side of the operating arm. Each of these groups of six stationary contacts or lugs comprise a multiple appearance of three two conductor circuits which extend to a selector. Each selector is represented at each line equipment of the system by a multiple appearance of the three circuits on lugs accessible for engagement with the operating arm of each line. One of the three circuits indicates idle or busy selector equipment and upon engagement with the operating arm of a calling line, if a certain selector circuit is idle, this circuit causes the line equipment operating arm on the calling line to lock in place. This circuit also changes status upon the connection of a calling line to selector equipment and indicates to subsequent searching calling lines that the selector circuit is busy. A relay in the selector circuit participates in establishing this busy condition and in holding the connection of the two circuits. Another of the three circuits is the talking path which terminates in the selector on battery and ground thru a battery supply relay. As the talking path is closed thru at the calling telephone the line apparatus is so arranged that the talking circuit is held open when crossing busy selector circuits to prevent clicks on such circuits. Although the calling line while searching for an idle selector circuit has battery across it at the same potential as that standing on the selector battery supply relay, differences in coil and circuit resistances might develop and result in clicks which the above feature guards against. With the connection of a calling line and an idle selector the battery supply relay of the calling line is disconnected from the connection and the calling station now receives its battery supply from the selector. The engagement of a calling line and an idle selector caused the holding mechanism of the calling line to function and the circuit engaging the operating mechanism of the line to open due to operation of a relay in the line circuit which locks up on finding an idle selector and remains locked up while a connection is established. This locked up relay also disconnects the battery supply relay from the line circuit, the calling line now receiving its battery supply from the selector to which it is attached. The third circuit into the selector is for use in connecting the answering line to the calling line when the answering line has been found and activated by the selector.

During a period of peak load a calling line when searching for an idle selector may not find the desired circuit on its first movement across the selector circuits. The line apparatus is so arranged that if a line unit completes an exploring trip across the selector circuits and does not find an idle selector it operates a tripping mechanism which causes the operating arm to return to normal and again start searching for an idle selector. This procedure will continue until an idle selector is found or the calling party disconnects. As the line operating arms will only find it necessary to make two or more trips across the selector multiple during periods when all selector circuits are busy at one time it will only occur when the traffic load has exceeded its anticipated normal peak so a register has been added to the system to indicate that an overload has occurred and its extent.

We now have the calling line connected to selector equipment and battery supply to the calling station established thru a relay in the selector. This relay operated when the connection between the calling line and the selector was established. Operation of this battery supply relay of the selector caused associated relays to operate. One of these associated relays being of a type designed for slow release is not affected by dial pulsing so remains operated throughout the period of the connection and thereby keeps the other in its operated status. This second relay is responsible for many functions of the selector. When the selector was idle one of its back contacts presented ground to searching calling lines. When the selector is taken by a calling line it supplies battery to the relay controlling the locking mechanism of the calling line. This relay in the selector also controls establishment of dial tone and, if necessary, busy tone on the calling line together with connecting the equipment which will select the answering line when dialing takes place. It also releases the selecting equipment when the call is completed.

When the selecting equipment is taken into use by a calling line, dial tone is connected and indicates to the calling subscriber that dialing may be started. The calling subscriber operates his dial interrupting the current flowing in the line at a desired value according to the number of the desired telephone as controlled by the dial and causing an attendant series of breaks and makes to take place in the battery supply circuit which causes the battery supply relay to fluctuate accordingly. The selector circuit is so arranged that each series of pulsations causes certain contact banks, or registers to operate in accordance with the dialing values. In a 10,000 termination exchange four dialing operations would be required. Upon completion of these four dialing operations the selector equipment is so arranged that it stands ready for activation of the line being called. Co-incident with completion of dialing by the calling line scanning apparatus is activated. The scanning feature is provided to control the connection of called lines and to prevent the simultaneous connection of two answering lines. This apparatus consists of an operating arm similar to that of the line equipment except that it carries but two contact fingers, or wipers, instead of six. Movement of the scanning arm is controlled by an electromagnet which causes its shaft to press against a roller which is in continuous motion. Finger-like contacts, or wipers, on the scanning arm engage contact lugs associated with each selector circuit similar to those at the line end of the selector. When the contact fingers of the scanning equipment arrive at a line on which dialing has been completed it places battery and ground across circuits thru the selector register network and standing ready for operation on the answering relays of the line it is desired to call. The line circuit is so arranged that when its answering relays receive the momentary pulse of battery and ground from the scanning circuit the answering relays are disengaged from the selector network. The scanning pulse also caused the selector to complete its preparations for connection of the answering line by locking in place a contact which establishes a short across the third circuit appearing on the selector circuit lugs. Associated with this locking contact is an additional contact which closes and causes an operating arm associated with the selector circuit to start functioning. When the answering relays of the called line disconnected themselves off of the selector register network one of the answering relays, at the same time, started movement of the operating arm of that line by engaging its ratcheting shaft and the revolving eccentric individual to that line. We now have the operating arm of the selector circuit and the operating arm of the line that the selector called, moving in unison. The contact lugs at the selector circuit are so arranged that the selector operating arm closes a circuit thru a relay winding and the previously locked contact to the selector multiple at the line equipment. The operating arm of the called line having arrived at the selector's multiple circuit at the same time, the circuit partially established by the selector is completed thru the called line circuit where a hold relay and the locking mechanism of the answering line is operated and the called line's operating mechanism is caused to lock up. This completion of the circuit caused current to flow thru a winding of the lock release relay of the selector and causes the locked contact to restore to normal thereby opening the contacts it had been holding in the closed position while waiting for the connection of the called line. Opening of the contacts stopped the movement of the operating arm of the selector circuit by depriving its controlling relay of energy. The operating arm of the selector circuit then dropped back to its original position. If the called line's operating arm and the selector's operating arm had not arrived at the same selector's multiple in unison the selector's operating arm would have continued on to a local contact lug which would have established a circuit releasing the locked contacts and energizing an alarm circuit. An indicator would also have been activated to show maintenance forces which selector circuit had failed to complete a connection. At the same time the operating arm of the called line having failed to keep in unison with the operating arm of the selector would be unable to connect so would have continued its movement until the operating limit had been reached at which time it too would have operated an alarm and locked in place to indicate the line in trouble. If other selectors have completed dialing standing upon them the scanning arm will not return to normal but will meet each selector in turn, activate the line being called and the operating arm of the associated selector circuit. When the scanning arm reaches its operating limit a tripping mechanism causes it to return to its starting point. It is dead on this return movement as it is desirable to activate the answering lines in relatively the same sequence that the selector equipment was taken by the calling line. While one scanning arm is making its return movement to normal a second scanning arm can be started by the tripping action of the first scanning arm. This second scanning arm has not been included in the detailed descriptions.

When the scanning apparatus places battery and ground onto the circuit pattern, or register, established by dialing, the battery and ground are connected thru the answering line relays of the line unit of the called line if the line is not busy. However, if the called line is busy and the battery and ground are applied by the scanning mechanism the circuits cannot be completed thru the answering line relays but a circuit is completed thru a parallel circuit in the selector network. This parallel circuit is marginal and is unable to operate if the called line is found available. When the parallel circuit does operate it locks up and maintains busy tone on the calling line until the calling party disconnects.

With operation of the hold relay of an answering line a circuit is closed thru a ringing relay in the line circuit and the called station is signaled by ringing its bell. This ringing circuit is that which is commonly used in telephone practice wherever machine ringing is employed, in that an alternating current is superimposed on a direct current. The called station when not in use for talking maintains a condenser across its line allowing the A. C. component to ring the bell but holding the circuit open to the D. C. component. When the called party answers, the direct current is then allowed to flow and the ringing relay of the line circuit operates and remains operated while the connectioin is established. The called line receives its talking battery supply thru a relay in the line circuit. This relay normally stands across the line to activate the apparatus when a call is incoming but when the line is answering its status changes and it performs the battery supply function for the answering line.

The main feature of this invention is the apparatus used for establishing the numerical value of the line being called and the projection of that value into the line equipments to activate the one line desired by the calling party. Each selector circuit consists primarily of such apparatus with attendant controls. In operating to a desired value in a ten thousand line telephone system but three relays are in use. One of these three relays closes contacts in accordance with the values introduced when the calling party dials. These contacts are arranged in four banks, or registers, one being activated by the thousands dialing operation, another by the hundreds dialing operation, another by the tens dialing operation and the other by the units dialing operation. During each dialing operation a pulse absorbing relay is operated which holds a circuit open until the pulsing of one dialing operation has been completed at which time it closes and activates the third relay which directs the next dialing operation into its correct contact bank. Upon completion of the four dialing operations one set of contacts in each of the four banks of contacts are closed and represent the numerical value determined by the dialing. Now let it be assumed that the desired line is numbered 3498. The dialing operations closed the third group of contacts in the thousands bank, the fourth group of contacts in the hundreds bank, the ninth group of contacts in the tens bank and the eighth group of contacts in the units bank. The first two dialing operations selected the group of one hundred lines in which the desired line is located, namely the fourth hundred of the third thousand. A ten thousand line system can be divided into one hundred groups of one hundred lines. In this invention this is accomplished at the banks of contacts. Each numerical value of the ten units of the thousands bank is divided into ten units at the hundreds bank. When any thousands unit is activated it connects a common which stands across the units of the hundreds bank. In this case unit three of the thousands bank was energized thereby energizing a common representing the third thousand in the hundreds bank. The fourth group of contacts in the hundreds bank having been closed by the dialing operation we now have prepared a circuit to the group of one hundred lines in which the line we desire is located. This circuit as now set up is a common to the one hundred line group selected. We now have this circuit established on a common across the thousands bank of contacts on which the third set of contacts is closed projecting the circuit onto the third common across the hundreds bank on which the fourth set of contacts is closed therefore we have established a circuit to the group of one hundred lines desired. Another circuit on which the selection is being made enters the equipment at the common across the tens group of contacts where the dialing had closed the ninth set of contacts which in turn is connected to the ninth common of the units bank where the eighth group of contacts being operated has completed the connection of the units side of the circuit to the ninety-eighth circuit of the hundred possible units selections. Now let it be assumed that this last circuit has been connected in multiple to the coils of all line equipment operating relays whose call numbers end with the digits ninety-eight. In a ten thousand line system there will be one hundred of such relays connected to this circuit. The first circuit of the selector pair which, as has been explained, is common to the thirty-four hundred group of lines is connected in multiple to one side on each of the line equipment operating relays of that group. The selecting circuits have now been completed and are ready to be energized. Associated with the units bank of contacts is a contact which closes with the first units pulse and normally holds the selector circuits open when units dialing is not taking place. Also associated with the units bank of contacts is a set of contacts which control a pulse absorbing relay which keeps the selector circuits open until dialing has been completed thereby preventing premature operation which might result in a wrong number being connected. Upon starting of the units dialing the scanning apparatus is activated if not already in motion due to the action of another selector. A contact which closes with the starting of the units pulsing operations establishes a current thru the operating magnet of the scanning equipment thereby setting the scanning equipment in motion. The contact fingers, or wipers, of the scanning equipment carrying battery and ground engage a set of contact lugs associated with each selector circuit and on meeting a selector on which the dialing operations have been completed current passes thru the contact finger to which battery is connected, into a contact lug and over one of the selector circuits; thru a coil which controls a mechanically locked contact; thru the contact of the pulse absorbing relay; thru the ninth contacts of the tens group, the eighth contact of the units group on the ninth common and out to the lines ninety-eight of each hundreds group. The only line ninety-eight which has the other selector circuit completed through the selector register to its associated line relay is in the thirty-fourth hundred group of lines.. This last mentioned selector circuit is connected thru contacts in the fourth group of contacts at the third common of the hundreds bank and thru the common and third contact of the thousands group to the selectors scanning contact lug, a contact finger of the scanning arm and to ground completing the circuit. When the above described current passed thru the answering relays of line 3498 it caused these relays to operate thereby causing the operating arm of that line to start operation. One of these answering relays locks itself energized and thereafter opens the selector register circuits extending to these answering relays. At the same time the mechanically locking relay of the selector circuit, which was energized in series with the other of the answering relays of the line, closes a circuit thru the operating magnet of the selector circuits operating arm causing that arm to move in unison with the operating arm of line 3498. When the two operating arms arrive at their respective contacts in the selector circuit multiple the operating arm on line 3498 will lock in place and that line will now be connected to the proper calling line and to the selector circuit.

The four selector banks are restored to normal when the calling party disconnects and battery standing on a bank contact of the release relay of the selector is maintained in two electromagnets until the four groups of selecting contacts are normal at which time the restoring circuit is opened.

The answering line selector wires can be multipled across as many banks of selector contacts as may be required by a given system.

Figure 1:
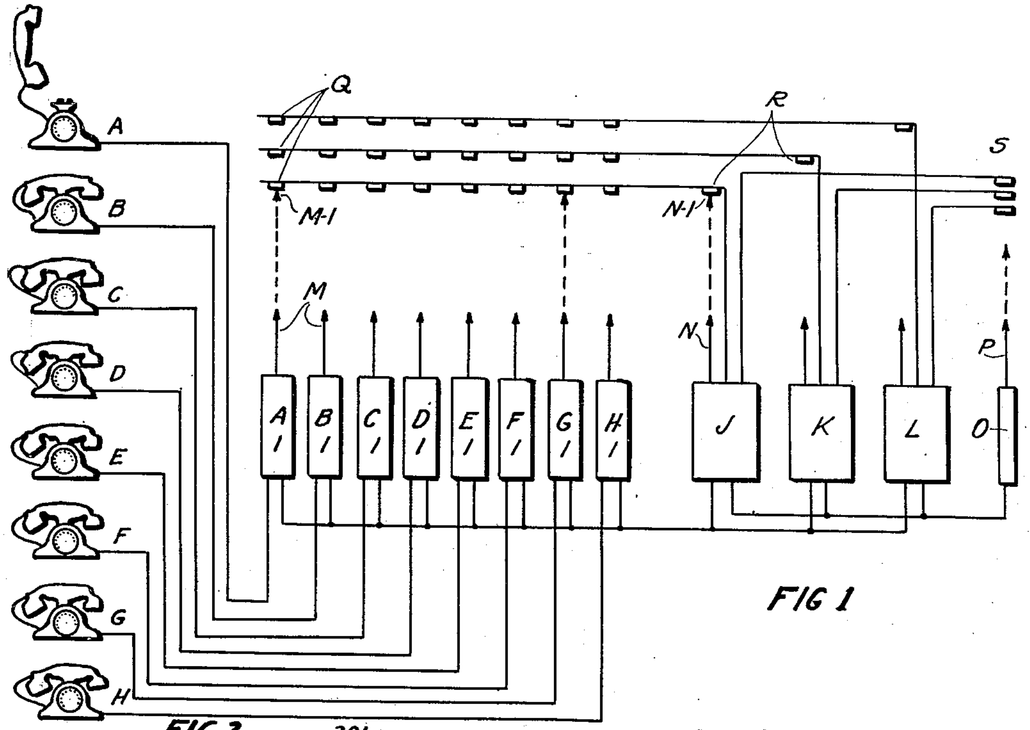
Fig. 1 is a block diagram showing the relative arrangement of a small number of the principal elements of this invention, eight typical dial equipped telephones with their line equipments, their relation to multiple appearances of three selector circuits and their equipment, the scanning equipment, the selecting multiple and the various operating arms.

Fig. 1 is a block diagram of the system and indicates in general the processes and equipment involved in establishing and maintaining a connection between two dial telephones using the automatic switching system with which this invention is concerned.

Each telephone is connected to the system thru line equipment individual to the telephone. This line equipment can be used for calling into the system or for answering purposes when the line is called.

The selector circuits place dial tone on the calling lines when such lines establish connection with a selector, select the called line when dialing takes place and control the connection between the calling and called lines.

The scanning circuit controls the sequence of establishing connections to prevent confliction and is common to the system.

Referring to Fig. 1 assume a person at station A desires to call station G. He lifts the receiver or hand set of his telephone which energizes line equipment unit A—1. This line equipment unit is permanently associated with his line. The line operating arm M which is part of his line equipment unit immediately starts moving upward to cross the connecting multiple in search of an idle selector circuit. Selector circuit multiple contacts which appear at each line are indicated at Q. On finding an idle selector circuit, assume that it was J, the line operating arm M stops moving and is locked in place as shown at M—1 in the diagram. With this connection between the calling line and the selector dial tone is established on the calling line and the calling subscriber at A on hearing it operates his dial to the directory number of the line he desires. The values dialed into the selector circuit J are set up on switches, or registers, in accordance with the dialing operations. These switches establish circuits thru the selecting register network to the desired line but the circuits are not energized until the scanning operation takes place. The scanning equipment O is energized by the last dialing operation into a selector or may already be in operation due to the action of some other selector. When contacts on the scanning arm P engage the selector circuit scanning contacts at S in moving across them, the operating arm of the called line is activated, if dialing has been completed. The circuits in the selector network standing on the desired line equipment are energized and the line equipment functions in its called or answering condition. The operating arm M of the desired station, in this case G, is activated and starts to move upward toward the connecting multiple. When the scanning arm P energized the circuit to the called line it simultaneously caused the selector operating arm N of selector circuit J to become energized and start to move upward toward the connecting multiple. The line operating arm of equipment G—1 and the selector operating arm of equipment J are now moving in unison and will reach the connecting multiple contacts Q of selector circuit J at the same time. On doing so the line operating arm will lock in place and automatically ring the bell of the telephone at station G. The line operating arm M of line equipment A—1 will remain on the selector circuit contact lugs Q until the call is completed or the calling party disconnects. The selector circuit operating arm N falls back after having completed its function in escorting the called line to the correct circuit in the connecting multiple.

The detailed descriptions to follow will cover many features not touched upon in the foregoing brief outline. Busy indication, overload registration, trouble indication, reverting ringing tone and ringing control, together with other essential features will be presented with the detailed descriptions of mechanical and electrical devices which are part of this invention. In addition, it is believed that with this description and those to follow showing how connections can be established between exchange lines of the same grade it will be readily understood that other operating features normal to a major size telephone central office such as inter-office trunks, information lines, service observing circuits, lines to operators' positions, testing circuits, toll trunks, long lines, etc. can be incorporated into this system without difficulty so it has not been deemed essential to include descriptions and drawings of these and other normal features which have no influence on the design of the basic exchange line switching system. Power supply sources and controls also have no influence in the design of this system and where battery is indicated herein it may be assumed to be the usual 48 volt storage battery commonly used in telephone central offices. Where reference is made to ringing current, busy tone or dial tone it may be assumed that frequencies and operating intervals in common use will apply.

*Mechanical details of the line equipment unit*

The specific mechanical structure of the telephone switches used in this system is being claimed in a divisional application, Serial No. 2,727, filed January 16, 1948, now Patent No. 2,477,259, granted July 26, 1949.

With the foregoing general description of the invention and the apparatus employed in mind the invention will now be considered in more detail.

The essential mechanical details of the line equipment unit are shown in Figures 9, 10, 11, 12 and 13. Fig. 9 is an elevation view showing that the unit is largely enclosed in a metal supporting frame 901 and is installed by suspension from ironwork above. It can be seen that the removal or replacement of a line unit would be a relatively simple operation. Extending across the supporting frame 901 are two braces 931 and 973 which also serve as support and guides for other equipment. Within the supporting frame 901 another rather complex frame is established. Its upper end consists of crosspiece 985 which carries contact fingers, or wipers, 987, 988, 989, 992, 993 and 994. Its sides are comprised principally of commutator strips 951, 952, 953, 956, 957 and 958 and their insulation and supports. The bottom member of the frame consists of a strap which is provided to hold the frame rigid. In the center of this inner frame but not attached guide bar 940 is provided to keep the inner frame in alignment when it is raised and lowered. Ratchet bar 933 lifts the inner frame and is enclosed in a guide channel 932; locking plate 934 functions in holding the inner frame at any desired level when ratcheted into position. Shaft 921 and its associated operating pawl 924 lift the inner frame causing its finger-like contacts to move across fixed contacts in the selector circuit connecting multiple illustrated in Figures 2, 3 and 4. At each line equipment unit a continuously revolving eccentric wheel 905 is provided. When a line equipment unit is activated this eccentric 905 furnishes the necessary reciprocating motion for the ratcheting operations.

The lower end of ratcheting shaft 921 carries two fittings, 917 which is attached permanently to shaft 921 by rivet 920, and 918 which has a short shaft 919 which extends into fitting 917. At the lower end of fitting 918 a wheel 909 is attached. This wheel 909 reduces friction as the irregular contour of eccentric wheel 905 is followed by the ratcheting shaft assembly when in operation.

Figures 2, 3, 4:
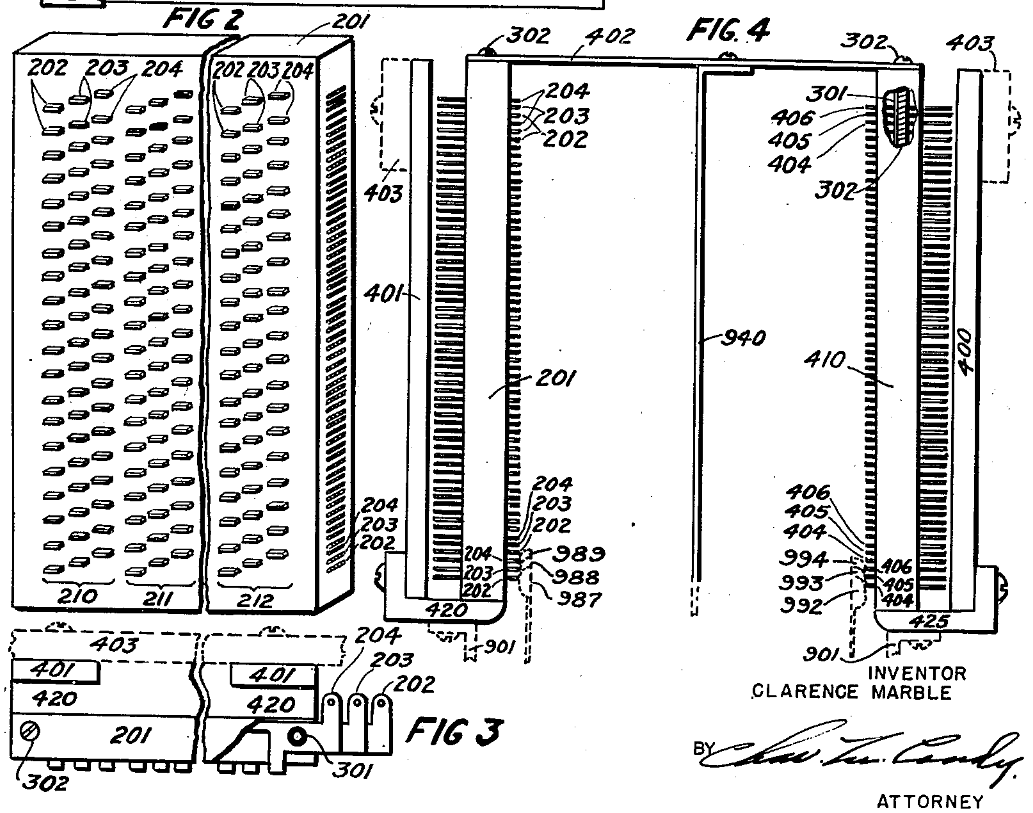
Fig. 2 is an elevation view showing the arrangement of selector circuit contact lugs as multipled at each line. In this figure one side of twenty selector circuits are shown as they would appear at three line equipments.
Fig. 3 is a plan view of one side of the selector contact lugs as they would appear at three lines. It shows the arrangement of the contact lugs, assembly bolts, terminal lugs for connection of wire and the arrangement of supporting members.
Fig. 4 is an end view of the selector contact multiple and shows both of the selector circuit contact groups and their supports. The guides for line operating equipment are indicated and dotted lines represent the location of line apparatus in relation to the selector contacts.

The top member of the inner frame is crosspiece 985 which appears in Fig. 9. It is made of insulating material and carries two sets of three contact fingers, or wipers, one set at each end. The contact fingers 987, 988 and 989 are at one end and contact fingers 992, 993 and 994 are at the other end. The two groups of contact fingers are held in place by grooved pieces of insulating material 986 and 991. The grooves are provided on the lower side of pieces 986 and 991, as can be seen by reference to Fig. 12. These grooves hold the contact fingers in alignment. In Fig. 9 part of crosspiece 985 and part of piece 991 are shown broken away to show a typical screw 969 and its insulating bushing 968. The screws holding pieces 986 and 991 in place are the self threading type. Slight recesses are required in the sides of the contact finger material at the location of the screws to allow the bushing and screw to be installed as shown. These recesses are not illustrated and can be omitted if the contact fingers and their associated selector circuit contact lugs in Fig. 2 are spaced sufficiently far apart to clear the bushings. This however is undesirable as the over all length of the installation of a number of line units will be increased considerably.

On the left hand side of the supporting frame 901 three electromagnets 501, 502 and 504 are mounted. These electromagnets when energized activate certain mechanical apparatus in addition to operating contacts involving electrical functions. Hereafter the electromagnets will be referred to as relays.

Relay 501 has its armature attached to a bar 1306 shown in Fig. 13. This relay 501 is energized when a call is incoming. It also is energized while a called station is connected.

Relay 504 has its armature attached to a bar 906 which is arranged and equipped similar to the bar 1306 of relay 501. The bar 906 associated with relay 504 is shown in Fig. 9 only.

The locations of the contact groups of relays 501 and 504 are represented at 981 of Fig. 9. The contact group of relay 504 is shown in part at 981 and the contact group of relay 501 is located immediately behind and parallel to the contact group 981 shown.

Bars 906 and 1306 are normally in the same relative position and the apparatus they carry is identical except that their principal elements face inward to permit common engagement with certain pieces of apparatus as will be explained.

Each of bars 906 and 1306 is slightly larger at the contact end than at the relay end. Sliding pieces 914 and 1314 are fitted over the small end of their respective bars 906 and 1306 and held against the enlarged portion of the bars by springs 915 and 1315. Each of the bars 906 and 1306 carry a similar pin, though illustrated on bar 1306 at 1307 only. The sliding members 914 and 1314 normally maintain a slight pressure on their respective springs 915 and 1315 due to the pressure of their respective contact springs 981 exceeding the pressure of springs 915 and 1315. This margin of pressure is effective only when the respective relays 501 and 504 are de-energized.

The sliding members 914 and 1314 are so shaped that a lip or ridge 1359 extends across their inner side. This ridge will press against latch 908 when bar 906 or 1306 is shifted by operation of the associated relay. When a bar 906 or 1306 is shifted toward the contact groups shown at 981 the sliding member 914 or 1314 on the bar will move with the bar due to the pressure of its spring 915 or 1315, both of which are made of flat spring material and are suspended from the lower side of shelf 973. When the sliding member reaches latch 908 the latch 908 will be moved in the direction of fitting 918 until a lip at the lower end of latch 908 rests against fitting 918. The shifting of bar 906 or 1306 also caused a pin in the respective bar, illustrated as in bar 1306 at 1307 to move with the bar. This pin when shifted lifts latch 910 clear of notch 911 in fitting 918. Latch 910 is made of flat spring material suspended from shelf 973 and normally maintains a slight pressure against fitting 918. Spring 916 is made of wire spring material and is also suspended from shelf 973 though the attachment is not illustrated. This spring 916 is so tensioned that it normally holds latch 908 clear of fitting 918.

When latch 910 is lifted clear of notch 911 fitting 918 is free to move downward and is impelled to do so by a wire spring 913. As previously stated, eccentric 905 is in constant rotation so the wheel 909 of fitting 918 will engage and follow its contour when fitting 918 moves downward. At a low spot in the contour of eccentric 905 slot 912 in fitting 918 will have been carried downward to a point where it will engage the lip of latch 908. When the lip of latch 908 enters slot 912 fittings 917 and 918 become coupled and ratchet shaft 921 is raised and lowered in a reciprocating motion as wheel 909 follows the varying contour of eccentric 905. This action continues while the coupling is maintained and the holding relay, to be explained later, is not operated.

Fig. 10 is a partial cross section of the line equipment unit at a point immediately below crosspiece 985. For clarity wires 995 have been omitted from this view. In Fig. 10 and in Fig. 11 holding pawl 925 is shown adjacent to operating pawl 924. When ratchet shaft 921 moves upward operating pawl 924 which normally rests immediately below the upper tooth of ratchet bar 933 also moves upward and lifts ratchet bar 933. The upper end of ratchet bar 933 is in engagement with the lower side of crosspiece 985 therefore as ratchet bar 933 lifts, the entire inner frame assembly is lifted accordingly.

The reciprocating motion of operating pawl 924 and the holding action of pawl 925 in preventing reverse motion is an action in common use so a detailed explanation of slip, clearances, etc. will not be entered into. Operating pawl 924 is pivoted on pin 999 in shaft 921 and is held under slight tension against ratchet bar 933 by a wire spring 926 supported by a bracket which is part of brace 931. Holding pawl 925 is pivoted on the above mentioned bracket which is part of brace 931 and is held under slight tension against ratchet bar 933 by wire spring 927.

The length of the teeth in ratchet bar 933 and the lifting distance in the contour of eccentric 905 are controlled by the ratchet bar slip and pawl clearance requirements and by the vertical distance between two similar terminal lugs in the selector circuit multiple which stands above the line units and is engaged by the contact fingers 987, 988, 989, 992, 993 and 994. If reference is made to Figures 2 and 4 it will be seen that while contact finger 987 is resting on a 202 contact lug, contact finger 988 is resting on a 203 contact lug, contact finger 989 is resting on a 204 contact lug, contact finger 992 is resting on a 404 contact, contact finger 993 is resting on 405 contact lug and contact finger 994 is resting on a 406 contact lug. These six engagements represent connection of one line equipment to one selector equipment. To connect the same line equipment to the selector circuit immediately above it is necessary to lift the contact fingers into engagement with similar numbered contacts appearing immediately above. Each ratcheting cycle must provide this amount of lift on the upward movement to bring the contact fingers into full engagement with a different selector circuit at each upward step.

Stop 922 has been inserted into shaft 921 to limit the downward movement of that shaft by engagement with the shelf of bracket 973.

The bottom of ratchet bar 933 contains a pin 937. When ratchet bar 933 is in its normal or lowered position this pin 937 extends thru a hole in a shelf which is part of brace 973 and engages contact group 938 holding its contacts under tension. When ratchet bar 933 is lifted the pin 937 raises with it and the contacts of group 938 function accordingly.

Reference to Figures 10 and 11 will disclose an L shaped piece of metal 934 which is part of the inner frame and is held in place by machine screws, the heads of which can be seen in Fig. 9 resting on pieces 850 and 985. This L-shaped piece is provided principally to support guide channel 932 which is welded in place, and to provide notches 935 which are used in the holding operations. These notches 935 are in the same number and the same spacing as the teeth in ratchet bar 933. The L shaped piece 934 being part of the inner frame is raised and lowered with that assembly.

Associated with relay 502 is bar 928 which carries a sliding element 930 and a latch 929. The upper part of bar 928 is so arranged that it forms an arm-like projection which extends across the inner side of pawls 924 and 925. This arm can be seen more clearly in Fig. 11. Bar 928 is also associated with contact group 980 so when relay 502 is energized the contact group will function in its operated arrangement due to the armature of relay 502 shifting bar 928 slightly thereby applying pressure to the springs of contact group 980.

Bar 928 is slightly larger at its contact end than at its relay end. At the relay end sliding member 930 rests against the end of the enlarged portion under the pressure of spring 949. The pressure of spring 949 being less than that of contact group 980 the pressure of contact group 980 normally hold bar 928 in the position shown in Fig. 9 when relay 502 is de-energized. It will be noted that sliding member 930 is held clear of L-shaped piece 934 when bar 928 is normal. Sliding member 930 has a lip or ridge on its inward side similar to that of sliding member 1314 shown in Fig. 13 at 1359. When relay 502 is energized its armature causes bar 928 to shift toward contact group 980 thereby operating the contacts and at the same time causing sliding member 930 to move in the direction of the contacts 980 until its lip rests against L-shaped piece 934 at which point it will stop while bar 928 continues to move to its maximum.

The arm extending at a right angle from bar 928 and associated with pawls 924 and 925 causes these pawls to lift away from ratchet bar 933 against the pressure of springs 926 and 927 as bar 928 progresses. Latch 929, made of flat spring material and attached to bar 928 has a lip at the lower end which is pressed against ratchet shaft 921 where it engages notch 923 at the peak of an upward motion of shaft 921 thereby holding the ratcheting shaft assembly practically clear of eccentric wheel 905.

When pawls 924 and 925 are lifted clear of ratchet bar 933 this ratchet bar is no longer supported and therefore drops to its original position in guide channel 932 with its lower end resting on the shelf of brace 973 and its pin 937 operating contact group 938.

Relay 502 is caused to operate by certain circuits established by engagement of the contact fingers of the line unit and the contact lugs of the selector circuit multiple. This relay is responsible for holding a desired connection between a line unit and a selector circuit, therefore its operation is timed to take place immediately after a notch 935 in L-shaped piece 934 has passed the lip of sliding member 930 in an upward movement so that with the disengagement of pawls 924 and 925 and a subsequent slight downward movement of the inner frame this lip will engage a notch 935 accordingly and hold the inner frame assembly in place throughout a connection.

When a call is completed and holding relay 502 is de-energized and bar 928 resumes its normal position due to the pressure of contact springs the enlarged end of this bar being in engagement with sliding member 930 cause it to disengage from the notch 935 in L-shaped piece 934. The pawls 924 and 925 resume their former position with their tips resting against ratchet bar 933 immediately under its upper tooth due to the shifting of the arm of bar 928 which had been holding them and due to the pressure of springs 926 and 927. The lip in latch 929 disengages from the notch 923 in ratchet shaft 921 with the return to normal of bar 928 allowing the ratchet 921 to drop.

When sliding member 930 on bar 928 disengages from a notch 935 in L shaped piece 934 the entire inner frame of the line unit is without support therefore the whole assembly drops to its normal position where it rests on the top of ratchet bar 933 which had previously dropped when the locking operation by relay 502 took place.

Coil springs employed to impell the downward movement of ratchet bar 933 and the downward movement of the inner frame are not shown in the illustrations.

When a line unit is employed in a calling-in operation its relay 501 is operated until the holding relay 502 is energized at which time relay 501 is de-energized. When relay 501 is de-energized its bar 1306 returns to normal, the lip of sliding member 1314 releases its pressure on latch 908 therefore its lip is caused to disengage from notch 912 due to the action of spring 916. At the same time pin 1307 returned to its normal position releasing latch 910 and allowing it to return to a position where its lower end rests against fitting 918. When fitting 918 raises to its maximum due to the action of eccentric 905, latch 910 will fall into notch 911 thereby holding fitting 918 practically clear of eccentric 905. The associated contact group also returns to its normal condition.

When a line unit is employed in an answering operation relay 504 is energized and remains operated until the call is released. Relay 501 also operates when the called station responds but its primary function in the answering circuit is to supply talking battery to the answering station. All of its ratchet control operations take place when relay 501 is energized in its answering function but they are not effective due to similar operations having been previously made by relay 504. However when the calling station disconnects relays 501 and 504 of the answering line unit fall away together, bars 906 and 1306 resume their normal positions; sliding members 914 and 1314 release their pressure on latch 908 thereby disengaging it from notch 912, latch 910 engages notch 911 due to the shifting of pins 1307 and 907. Pin 907 is not shown on the drawings. Fitting 918 is locked up in a raised position once more.

A mechanism is provided to restore the inner frame to its normal position when the contact fingers of a line unit have traveled entirely across all of the selector circuit multiple contact lugs in the calling-in operation. This mechanism also controls the locking up of the line equipment and the sounding of an alarm when a line unit fails to connect to its calling line during the answering operation of the line unit. For the purposes of this specification it is called the tripping mechanism and is illustrated principally in Figures 9 and 14 to which reference is now made. It will be seen that the external springs of contact group 982 consists of flat springs 947 and 948 which interlock at their upper terminals. Both springs are tensioned toward L-shaped piece 934 but do not quite touch it. The horizontal section of spring 947 is also tensioned upward slightly. Near the bottom of L-shaped piece 934 and on the side away from the guide channel 932, pin 945 projects toward the contact group 982 and is sufficiently long to engage the bulge in spring 948 near its base. Vertically pin 945 is so located that when the contact fingers have crossed all of the selector circuit contact lugs a subsequent ratcheting operation will cause this pin 945 to travel over the bulge in spring 948 thereby pushing that spring toward the other springs of the contact group. This movement of spring 948 caused its upper end to move outward beyond a step in spring 947 which being tensioned upward causes the two springs to lock together. This movement of spring 948 also caused the contact springs to function in their operated status. While pin 945 was being lifted and was approaching and engaging the bulge in spring 948 pin 946 was moving away from its normal position in which it rests upon the end of spring 947. The operation of the contact springs 982 caused the upward movement of L-shaped piece 934 and the associated inner frame to stop and then return to its original position. Pin 946 upon reaching and engaging the tip of spring 947 presses the end of that spring downward sufficiently to clear its step from engagement with spring 948 thereby causing that spring to return to its original status and the contact springs 982 to resume their non-operated status.

Spring assembly 982 is supported by a bracket 954 attached to the shelf formed by brace 973.

On each side of the frame assembly capped by cross-piece 985 three thin strips of conducting material are mounted for use as commutators in maintaining electric continuity to contact fingers 987, 988, 989, 992, 993 and 994 during the ratcheting operation and when the contact fingers have arrived at a desired position. These commutator strips are numbered 951, 952, 953, 956, 957 and 958 and are shown in Figures 9, 10 and 11. They are seperated by strips of insulation material 971 and faced by insulating strips 950 and 955. Machine screws with insulating bushings hold the two assemblies together attaching them to L-shaped piece 934, a flat piece of metal 972, and crosspiece 998. Pieces 933, 972 and 998 are drilled and tapped to accommodate the machine screws. Each commutator strip has a brush resting upon it under some tension. These brushes are shown in Figures 9, 10 and 11 and are numbered 960, 961, 962, 965, 966 and 967 and are made of spring material. To hold the brushes in place on the commutator strips the ends are formed in the shape of the letter U. Mountings for the brushes are indicated at 970 and 975 of Figs. 9 and 10. These mountings are arranged and held in place as are pieces 986 and 991 shown in Fig. 9 and described elsewhere. The lower end of each of the brushes is bent so as to project thru a slot in the line unit frame 901. The outward end of each brush is drilled for use as a terminal in attaching wire. The upper end of each commutator strip 951, 952, 953, 956, 957 and 958 is drilled for installation of wires 995 extending to the contact fingers 987, 988, 989, 992, 993 and 994. These wires pass thru holes drilled in crosspiece 985 and thru apertures immediately above the commutator strips.

*Selector circuit multiple equipment*

In the preceding descriptions references have been made to the selector circuit multiple contact lugs the arrangement of which is illustrated principally in Figures 2, 3 and 4. Figure 2 is an elevation view of one side of the selector circuit multiple as it will appear on the inward side. Each line equipment of the system is associated with three vertical rows of contacts on each side of the selector circuit multiple. This will be more clearly understood if reference is made to Figure 4 concurrently with Fig. 2. Fig. 4 is an end view of the selector circuit multiple equipment in which the 201 bank of contacts and its duplicate the 410 bank of contacts form the two side walls of a corridor. At regular intervals, as indicated by 210, 211 and 212 of Fig. 2, three vertical rows of contacts of each bank 201 are in alignment with a set of three contact fingers of a line unit. In other words one-half the contact fingers of each line unit, namely 987, 988 and 989 engage selector contactor lugs on one wall of the corridor and the other half of the contact fingers of the line unit, namely 992, 993 and 994 engage selector contact lugs on the other wall of the corridor. Figure 3 is a plan view of one-half of the selector circuit multiple contacts for a system employing but one pair of banks of selector circuit multiple contacts. With three vertical rows of contacts representing the longitudinal requirement for one line if a system exceeds, say 50 lines, the banks of selector contacts will be assembled accordingly in sections and the wiring tips of strips 202, 203 and 204 and their equivalents 404, 405 and 406 in the opposite bank will be duplicated at each end of the bank for installation of coupling wire between the sections. If sections of selector multiple contacts are used transpositions can be arranged in the coupling wiring between sections of the selector circuit multiple and in line circuit wiring to reduce the capacity effect in a long selector circuit multiple. It will be noted in Fig. 3 that the selector circuit multiple strips are narrowed considerably where material is not required for mounting screws, contact lugs and wiring terminals. This narrowing of the material in each selector circuit multiple strip to minimum width consistent with sturdy construction and low electrical resistance also tends to reduce the capacity effect between selector circuit multiple strips.

Typical mounting screws are shown in Figs. 3 and 4 at 302 and typical insulating bushings for the mounting screws 302 are shown at 301 in Fig. 4.

Straps 400 and 401 suspended from supporting ironwork 403 of the type commonly used in telephone buildings or cabinets hold the selector circuit multiple in place. These brackets 401 are drilled and tapped for attachment of angle irons 420 and 425 which are drilled and tapped at each line equipment for attachment of supporting frames 901 of the line units and at each mounting screw 302 to hold the selector circuit multiple banks in place.

In Fig. 4, plates 402 cover the entire selector circuit multiple. They are drilled at each 302 screw for mounting purposes and at each line equipment unit to hold the 940 guide bar of each line unit in place.

By reference to Fig. 2 and Fig. 4 it can be seen that the selector circuit contact multiple 201 and its equivalent 410 can be built up of successive layers of insulating material between selector circuit multiple contact strips 202, 203, 204, 404, 405 and 406 and with insulating strips at the top and bottom of the piles or its insulation can consist of moulded plastic material.

*Electrical details of the line equipment unit*

In the foregoing description of the mechanical details of the line equipment unit it was found necessary, for clarity, to introduce some of its electrical features. Now in describing the electrical features it will be necessary to include some of the mechanical operations previously described. Fig. 5 presents, in schematic form the circuit of the line equipment unit and includes sufficient mechanical details, also in schematic form, to show the relationship between mechanical and electrical functions.

In describing the circuit operations of the line equipment unit it is necessary to introduce some of the features of a selector circuit so if reference is made to Figs. 5, 6 and 15 jointly a better understanding of the operations will be obtained.

A single line equipment unit is employed for both the calling and answering operations of a line. In the calling operation certain circuits are established by the line equipment unit thru which the calling subscriber can, by dialing, connect his line to any desired line of the system. In the answering operation his line equipment unit responds to the calling operations directed into it by some other calling line.

A line equipment unit is provided for each station of a system. For example, on a four-party line four-line equipment units would be required for answering purposes. Three of the four equipments employed on a four-party line would have their calling features disconnected. Disconnection of the calling feature can be effected by opening two wires at the points indicated by reference 540 of Fig. 5 or by placing thin pieces of insulating material in break contacts 581 and 583 connected to these wires at locking relay 502. Reference 511 of Fig. 5 indicates the location of main distributing frame terminals and jumper wires in the circuit. Reference 550 is the location of intermediate distributing frame terminals and jumper wires in the circuit. An intermediate distributing frame will only be required where the system is to provide party line service. The various line equipment units assigned to one line will be bridged to the line at this point. Terminals at 518 of Fig. 5 are provided to connect the various ringing frequencies of generators 515 to the line equipment units in accordance with their party line ringing assignments.

*Calling operations thru a line equipment unit*

Now let it be assumed that a calling operation is taking place from a station in a system embodying the apparatus with which this invention is concerned. To do so it is now necessary to refer to Fig. 5 which presents a typical line circuit. We will first assume that the telephone at 510 of Fig. 5 is being employed in the calling operation and that the receiver has been lifted.

For the purposes of this description the negative terminal of the central office battery of the system will be referred to as "battery" and the positive terminal which is usually grounded in practice will be referred to as "ground."

In Figure 5 the talking circuits are emphasized by heavy lines. Again referring to Fig. 5, at relay 501 battery and ground normally stand on the windings of that relay. A circuit from battery thru a break contact of contact group 982; thru a winding of calling relay 501; thru a break contact 583 of locking relay 502; thru one side of an IDF jumper at 550, if an IDF is used; thru one side of the MDF or connecting rack jumper at 511; thru the telephone at 510; thru the other side of the MDF or connecting rack jumper at 511; thru the other side of the IDF jumper at 550; thru a break contact 581 on locking relay 502; thru the other winding of calling relay 501 and to ground. The completion of this circuit caused calling relay 501 to operate and its bar 1306 to function in starting the ratcheting operations described with the mechanical details of the line equipment unit shown in Figs. 9, 10, 11, 12, 13 and 14. The ratcheting operations lift the inner frame, which has been previously described and is easily identified by the reference numerals shown in Fig. 5, and each upward ratcheting step lifts the inner frame accordingly to engage contact fingers 987, 988, 989, 992, 993 and 994 with their respective 202, 203, 204, 404, 405 and 406 selector circuit multiple contacts of selector circuits. Two selector circuits and one appearance of their multiple contacts are shown in Fig. 6. The selector multiple contacts are represented by short heavy lines in Figs. 6 and 15. Relay 502 is a type designed for slow release so it will not fall down during the interval of dial pulse.

Now it is necessary to assume that the first selector circuit engaged by the calling line circuits contact fingers was found to be idle. If reference is made to Fig. 15 it will be found that selector circuit multiple strip 406 is grounded on a break contact 1582 of relay 1503. When the wiper of contact finger 994 in Fig. 5 met the contact lug of selector circuit strip 406 in Fig. 6 a circuit was established from battery on the winding of locking relay 502 in Fig. 5; thru the winding of that relay to a break contact 577 on relay 504; make contact 596 of operated line relay 501; thru brush 967; thru commutator strip 958; finger 994, selector circuit multiple strip 406 in Figs. 6 and 15; thru a break contact 1582 of relay 1503 and to ground thereby causing locking relay 502 of Fig. 5 to operate and perform its locking function by activating its bar 928 as described with the mechanical details of the line equipment unit.

We now have the contact fingers of the calling line standing on what had been an idle selector circuit. To prevent another calling line from connecting to the same selector circuit the following features are provided. With operation of locking relay 502 of Fig. 5 the calling line from station 510 which had been standing on open make contacts at relay 502 is now closed thru and the calling short of the station at 510 is established on contact fingers 987 and 988 thru brushes 960 and 961 and commutator bars 951 and 952 is now continued thru to relay 1501 of Fig. 15 on selector circuit multiple strips 202 and 203 of Figs. 6 and 15. Battery and ground are standing on the windings of relay 1501 thereby operating that relay thru the short established by operation of the switch hook of the telephone at 510 of Fig. 5. With the operation of relay 1501 the ground maintained on selector multiple strip 406 thru back contact 1582 of relay 1503 is removed due to operation of relay 1501 placing battery thru the coil of relay 1502 and a make contact on relay 1502 placing battery thru the coil of relay 1503.

When relay 502 of Fig. 5 operated it closed four make contacts and opened six break contacts. Two of the four make contacts closed the talking circuit thru to the selector circuit as previously described. The third make contact places ground on the ringing circuit which is standing on the winding of relay 505 but is now open at make contacts 572 on relay 504 therefore non-operative in the calling line equipment unit. The fourth make contact 588 of relay 502 closes thru the ground standing on the winding of relay 502 and extends it thru brush 966; thru commutator strip 957; thru contact finger 993; thru selector multiple strip 405 of Figs. 6 and 15; thru a make contact 1581 on relay 1503 where it meets battery thereby holding relay 502 of Fig. 5 in the operated condition throughout the time that the calling short is maintained across relay 1501 of Fig. 15 by the calling station at 510.

Two of the break contacts 581 and 583 of relay 502 are in the battery and ground circuits thru the winding of relay 501, and extending to the telephone at 510. With the operation of relay 502 which has taken place this opening of the battery and ground circuits thru the winding of relay 501 causes that relay to fall back and the ratcheting operations of the line equipment unit to discontinue. With the operation of relay 502 the locking and pawl lifting actions of bar 928 in the line equipment unit also took place and the inner frame of the line equipment unit remains in engagement with the selector circuit it had found except that ratchet bar 933 being no longer supported has fallen back to where its pin 937 opens the contacts of group 936 which had operated with the first ratcheting operation.

It will be noted that calling relay 501 of Fig. 5 operates two break contacts and two make contacts when energized. It also will be noted that calling relay 501 was energized while a calling line was searching for an idle selector circuit. One of the break contacts 591 of calling relay 501 opens a circuit to battery thru the winding of locking relay 502, brush 962, contact finger 989, selector multiple contact strip 204 of Figs. 6 and 15 and to answering control contact 1520 of Fig. 15. When a line equipment is functioning as an answering line there is a short interval when contacts 1520 and 1521 are connected and ground is established on the control contact 1520, therefore to prevent false operation of relay 502, should it engage a selector circuit during the short interval that ground is standing on the conductor under discussion the conductor is held open in line equipments when performing their calling function.

The other break contact 590 associated with relay 501 of Fig. 5 opens conductor 530 in the answering line pattern circuit of that particular line so that if the line is called while calling, a busy signal will result. When holding relay 502 operates and calling relay 501 is de-energized the other answering line pattern circuit is held open by break contact 585 on relay 502. A complete description of the busy test feature will be found elsewhere in this specification.

The make contact 593 of calling relay 501 is in a circuit shown entirely in Fig. 5 from battery on a winding of locking relay 502, thru contacts 593 and 577 to a make contact in contact group 938, to a make contact in contact group 982 and to ground thru register 503. This circuit can function to cause operation of register 503 only when the contact fingers of a line equipment have crossed over all of the selector circuits of the system on a calling operation without finding an idle selector circuit. When ratchet bar 933 is lifted by mechanical operations following the operation of relay 501 in its calling function as previously described, pin 937 attached to ratchet bar 933 is lifted from engagement with contact group 938 causing that contact to close. The ratcheting operations also lift the entire inner frame so pin 946 at the top is moved away from engagement with spring 947 and pin 945 is moving toward the bulge in spring 948 as the ratcheting operations continue. Springs 947 and 948 comprise the tripping mechanism previously described with the mechanical operations of the line equipment unit. When the contact fingers have passed over all of the selector circuits pin 945 is so located that it engages the bulge of spring 948 on a subsequent ratcheting step causing that spring to interlock with spring 947 and hold the contacts of group 982 in an operated position with two contacts closed and one opened. When the pair of contacts of group 982 associated with register 503 are closed register 503 is energized together with holding relay 502. Operation of relay 502 and the incidental activation of its bar 928 caused the previously described holding operations to take place, the inner frame remaining in the elevated position and ratchet bar 933 falling back to its normal position where pin 937 operates contact group 938. The opening of contact group 938 caused holding relay 502 and register 503 to de-energize therefore, the holding operations being discontinued the inner frame drops back to normal and pin 946 rests on and depresses the tip of spring 947 allowing spring 948 to snap back to its original position thereby opening two contacts of group 982 and closing the other. The contact of group 982 which opened when spring 948 locked with spring 947 cut off the battery supply to relay 501 thereby suspending all ratcheting operations until the inner frame returned to normal and closed this contact in group 982. The calling subscriber still waiting causes relay 501 to again operate and the ratcheting operations to again lift the contact fingers across the selector circuits in search for an idle selector circuit. Register 503 is the type now in common use in telephone offices for message registration. The readings on register 503 will indicate to those concerned the number of times line equipment crossed the selector circuits and failed to find an idle selector circuit. The registers 503 are installed common to a group of lines.

When relay 1501 of Fig. 15 was operated due to the connection of a calling line, relay 1501 caused the operations of relays 1502 and 1503 over obvious circuits. Dial tone standing on conductor 1567 is introduced into the receiver of the calling telephone thereby indicating to the calling subscriber that dialing to the call number of the line he desires may be started. Conductor 1567 is cut off from dial tone generated by a break contact 1595 in contact group 1578 which is operated by ratchet bar 1643 which is to be explained later. Dial tone will be heard by the calling subscriber in the intervals between the dialing operations but will not be heard when dialing has been completed and the calling subscriber is waiting for the called line to connect. When the called line is connected the calling subscriber will hear reverting ringing tone while he is waiting for the called line to answer. This will be explained with the answering line operations thru a line equipment unit.

*Answering operations thru a line equipment unit*

Assume that a calling subscriber's line is connected to a selector and that he has completed the dialing operations to select a desired line and that the line circuit of the line he is calling is similar to that of Fig. 5. Shortly after the dialing operations were completed ground was applied momentarily to conductor 532 of Fig. 5 and at the same time battery was applied momentarily to conductor 530 of Fig. 5. The means employed for selecting the desired line and the introduction of battery and ground will be described with selector equipment and circuit elsewhere in this specification. Ground from scanning switch wiper 1550 is extended thru the selector network to conductor 532 and thru break contacts 574 and 585; and thru the winding of relay 504′ to battery for operating relay 504′ to connect ground to relay 504. Battery is extended from the wiper 1551 of the scanning switch thru the operated selector network, which has registered the called line, to conductor 530 and thence by way of contacts 590 thru the winding of relay 504 to ground at contacts 579. Relay 504 energizes and at contacts 575 completes a locking circuit thru its right hand winding while at contacts 574 opens the circuit to relay 504′ which now deenergizes.

With the operation of relay 504 its bar 906 in addition to operating contacts of group 981 caused the various ratcheting operations to start and the inner frame of the line equipment unit to move upward accordingly.

The battery supplied on conductor 530 of Fig. 5 for operation of relay 504 passes thru the winding of relay 1508 of Fig. 15 thereby operating that relay simultaneously with relay 504 of Fig. 5.

Relay 1508 of Fig. 15 carries three make contacts 1573, 1574 and 1579 which are mechanically locked into their operated positions when relay 1508 is energized. These contacts remain locked until relay 1509 becomes energized and releases them.

When the calling line established connection with the selector circuit at Fig. 15, relay 1503 became energized and battery thru its make contacts 1588 has been standing on make contact 1574 of relay 1508. With the operation of relay 1508 this battery is connected thru contacts 1579 and the winding of relay 1510 to ground thereby energizing relay 1510 and starting the ratcheting operations of the selector circuits operating arm causing its contact fingers 1535, 1536 and 1537 to move upward accordingly.

Selector multiple strip 404 is connected to the other lockup-make contact 1573 of relay 1508 so with the operation of relay 1508 selector multiple strip 404 is connected to answering control contact 1521 thru make contact 1573 on relay 1508.

The mechanical structure of the operating arm of the selector circuit is essentially that of the line equipment unit therefore it is believed unnecessary to provide a second description of the details of all of its features. However, the variations between the unit as employed in connection with a line and as employed in connection with a selector will be pointed out.

Shaft 902 is continuous between the line equipment units and the selector equipments. At each of the line equipments it carries eccentric 905 and at each of the selector equipments it carries a duplicate of the 905 eccentrics shown in Fig. 15 at 1523. Shaft 902 and its associated eccentric wheels at both equipments are in constant rotation. The lifts of the eccentrics 905 and 1523 are in alignment. This alignment is important as the operating arm or inner frame of the line equipment unit of the line called by the selector equipment must rise in unison with the operating arm or inner frame of the selector equipment. When the contact fingers 989 and 992 of the called line equipment unit of Fig. 5 engage their respective selector multiple strips 204 and 404 of Fig. 6 contact fingers 1535 and 1536 of Fig. 15 should at the same time be in engagement with their respective answering control contacts 1520 and 1521 which are wired in series with selector multiple contact strip 204, a make contact 1573 on lockup relay 1508 a winding relay 1509 and selector multiple contact strip 404.

Relay 1510 of Fig. 15 and its associated bar 1523 are duplicates of calling relay 501 of Fig. 5 and its associated bar 1306. All of the ratcheting functions of relay 501 are duplicated by relay 1510. Wheel 1524 of Fig. 15 is a duplicate of wheel 909 of Fig. 5. The ratchet shaft assembly comprised principally of fitting 918, shaft 921 and pawls 924 and 925 of Fig. 5 are duplicated by 1527, 1529, 1531 and 1532 of Fig. 15. Ratchet bar 933 of Fig. 5 is duplicated by 1530 of Fig. 15. Commutator strip 958 of Fig. 5 is duplicated by 1539 of Fig. 15. Contact finger 989 of Fig. 5 is duplicated by contact finger 1536 of Fig. 15. The location of contact finger 992 of Fig. 5 is duplicated by contact finger 1536 but this contact finger is the same length as contact finger 1535. Contact finger 1537 is in the location of contact finger 994 and its length is also that of contact finger 1535. Contact fingers 1535 and 1536 are connected together instead of being wired to commutator strips as are the contact fingers of the line equipment units as shown in Fig. 5.

Relay 1512 and its bar 1533 of the selector equipment of Fig. 15 operate a contact and lift pawls 1531 and 1532 as does holding relay 502 of the line equipment unit of Fig. 5. However relay 1512 does not perform a holding function. When relay 1512 operates, ratchet bar 1530 returns to normal due to the lifting of pawls 1531 and 1532 and is accompanied by the inner frame of the selector equipment.

Answering control contacts 1520 and 1521 are the same general type and construction as those of the selector circuit multiple shown in Figs. 2, 3 and 4 except that a space appears between them and wiring terminals are required on each. They are placed at the same level as the 204 selector multiple strip of their respective selector circuits and in vertical alignment with contact fingers 1535 and 1536 of their respective selector equipments.

Immediately above the level of the upper answering control contacts 1520 and 1521 and in alignment with contact finger 1537 a contact lug 1522 is installed as part of a circuit which indicates the failure of a selector and an answering line to establish a connection with the calling line. The operation of this circuit will be explained later.

Relay 504 of Fig. 5 and relay 1510 of Fig. 15 having been operated in unison their respective associated contact fingers move upward in unison. When contact fingers 989 and 992 engage selector circuit multiple strips 204 and 404 of the selector circuit the calling line is waiting on, and thru which the answering line was activated, the 1535 and 1536 contact fingers of Fig. 15 are in engagement with answering control contacts 1520 and 1521 of that selector circuit.

A circuit is now established in Figs. 5 and 15 from ground thru the winding of relay 502; break contacts 587; thru brush 965; thru commutator strip 956; thru contact finger 992; thru selector circuit multiple strip 404; thru a winding of relay 1509; thru a lockup-make contact 1573 of relay 1508; thru answering control contact 1521; thru contact fingers 1536 and 1535; thru answering control contact 1520; thru selector circuit multiple strip 204; thru contact finger 989; thru commutator bar 953; thru brush 962; thru break contact 589; thru a break contact 591 on relay 501; thru a winding of locking relay 502 and to battery thereby causing relay 1509 of Fig. 15 to operate and release the locked contacts of relay 1508 and also causing relay 502 to operate and lock up from ground thru one of its windings; thru one of its make contacts 588; thru brush 966, strip 957, wiper 993, selector multiple 405 to battery at make contact 1502. When relay 502 was operated its bar 926 caused all of the mechanical locking functions of its associated line equipment unit to operate and ratchet bar 933 to drop back to normal. The release of relay 1508 opened contacts 1579 to release relay 1510 so that the eccentric 1523 no longer actuates arm 1529.

When relay 504 was operated ground on one of its windings was connected thru its make contacts 575 to a break contact 586 on relay 502 and to battery therefore relay 502 held relay 504 operated until relay 502 energized.

When the calling line established connection with the selector circuit, battery from closed make contact 1502 on relay 1503 was established on selector circuit multiple strip 405, thru contact finger 993 of the calling line equipment unit, thru its commutator strip 957; thru brush 966; thru make contact 588 of the calling lines locking relay 502; thru a winding of that relay and to ground. This circuit is now employed in holding the calling line into engagement with the selector circuit. When the answering lines contact fingers engaged the selector circuits multiple contacts and became locked in place the 993 contact finger of the answering line equipment unit also engages contact multiple strip 405 upon which the above described circuit is standing, therefore battery thru make contact 1502 on relay 1503 and selector multiple strip 405 to the calling lines relay 502 also holds relay 504 of the answering line in operation by passing thru contact finger 993 of the answering line; thru its commutator strip 957; thru its brush 966; to the close make contact 575 on its relay 504 and thru a winding of that relay to ground, thereby holding the answering line equipment into engagement until the calling subscriber disconnects.

When answering relay 504 was energized it closed thru a circuit from the telephone 510 associated with its line equipment unit to ringing control relay 505 on the contacts of which the talking circuit now stands open toward condensers 508 and 509 and the contact fingers 987 and 988 which are now in engagement with selector circuit multiple strips 202 and 203 across which the calling telephone is standing.

When locking relay 502 operates, make contacts 589 places a ground on break contact 559 of ringing control relay 505. The connection of this ground provides a path from ringing generator 515, thru ringing interrupter 516; thru ringing resistance lamp 517; thru terminals at 518; thru a winding of ringing control relay 505; thru the break contact 558 of relay 505; thru make contact 570 on relay 504; thru IDF terminals at 550; thru MDF terminals at 511; thru the line; thru the ringer of the telephone; thru the condenser of the telephone at 510; back over the line, thru the MDF terminals; thru the IDF terminals; thru make contact 572 on relay 504, to the ground established on break contact 559 of relay 505 by operation of relay 502. Alternating current flowing over this path causes the bell of the telephone at 510 to ring.

The ringing periods are controlled by interrupter 516 which alternately connects the ringing circuit thru the ringing generator from battery and thru a direct conductor. During the ringing periods an alternating current is superimposed on a direct current which passes thru ringing resistance lamp 517 and a winding of relay 505 to the called telephone.

The condenser at the telephone 510 allows the alternating component of the ringing circuit to pass thru the bell while it holds the direct current component open. Ringing control relay 505 is the type in common telephone use designed for non-operation on alternating current and operation on direct current. The battery in series with the generator 515 has no effect as long as only bells are across the line but with the lifting of a receiver on the line a path is provided for the direct current thru relay 505 which responds and locks up thru its other winding and make contact 580 on holding relay 502, holding the relay 505 operated until holding relay 502 is de-energized and removes the ringing ground.

Condenser 560 allows a sufficient quantity of the ringing current to pass thru it onto the calling line to be heard by the calling subscriber as what might be called an echo thereby informing him that the line he called is being rung.

With operation of relay 505 the talking pair is now continued thru make contacts 558 and 559; thru condensers 508 and 509; thru make contacts 582 and 584 on locking relay 502; thru brushes 960 and 961, thru commutator strips 951 and 952, thru contact fingers 987 and 988 with which it is connected to selector circuit multiple strips 202 and 203 on which the calling telephone is standing.

A pair of wires extend from the talking circuit to the windings of line relay 501 to provide the talking battery for the answering telephone at 510. Calling relay 501 is operated in conjunction with the operation of ringing control relay 505 but the ratchet control operations of its bar 1306 have already been performed by the ratchet control bar 906 of relay 504.

The deenergization and release of relay 504' immediately after the energization of relay 504 at contacts 579 opens conductor 530 to provide a busy signal in case the answering line is wanted by other calling lines. Thus an open circuit on a conductor such as conductor 530 designates a busy line to the selector, or register.

Make contact 576 on relay 504 controls an alarm circuit which operates an audible signal and locks the line equipment unit in place when in its answering operation it fails to connect to the selector circuit thru which it has been called. This alarm circuit is from battery on the winding of locking relay 502; thru make contact 576 on relay 504; thru a make contact in group 982 of the tripping mechanism; thru the winding of alarm relay 506 and to ground. A make contact on relay 506 completes a circuit from battery; thru the alarm bell and to ground thereby operating the bell.

When the above circuit was completed thru locking relay 502 that relay performed its previously described locking function. As the alarm circuit can only be completed thru the tripping mechanism when the line equipment unit has operated to its limit in crossing the selector multiple and pin 945 has engaged the bulge in spring 948 it will be evident to attendants which line equipment unit had failed to perform its answering function. The line equipment unit is restored to normal by manually pushing its sliding member 930 clear of a notch 935 in L-shaped piece 934 shown in Fig. 5 and allowing the line equipment unit to return to normal where pin 946 will engage spring 947 of the tripping mechanism, cause contact group 982 to return to normal and open the circuit to ground on relay 506 thereby causing the bell to stop ringing.

Another break contact 577 of answering relay 504 is in series with a make contact in group 938 which controls operation of a register each time the line equipment unit fails to find an idle selector circuit while a calling operation is taking place. The operation of this circuit has been explained.

*Electrical and mechanical details of the called line selector unit*

The essential mechanical details of the selector unit are illustrated in Figs. 16, 17, 18, 19 and 20. However, as many of the mechanical operations of the unit are dependent upon the status of its electrical features it is believed that a clearer understanding will be obtained by descriptions taken from the functional diagram of the selector equipment shown in Fig. 15 to which reference is now made.

When a calling line found a selector to be idle the contact fingers of the line equipment unit became locked into engagement with multiple contact strips 202, 203, 204, 404, 405 and 406 of that selector circuit. When this connection was established with the calling telephone the selector circuit's multiple contact strips 202 and 203 participated in the closing of a path from battery thru a winding of relay 1501 thru the telephone, back to the other winding of relay 1501 and to ground thereby energizing relay 1501 and causing it to operate. The dial of the calling telephone is in series with the circuit which operated relay 1501 and normally maintains the circuit closed. However when the dial is operated it causes a succession of breaks to occur in the circuit between relay 1501 and the telephone in accordance with the value dialed. Therefore when dialing takes place relay 1501 de-energized and energized alternately thereby introducing the dial pulsings into the selector circuit.

Battery supply relay 1501 carries a make and a break contact. The make contact 1561 closes battery thru the winding of a slow release relay 1502 which, when operated, releases too slowly to be completely de-energized when a dial pulsing break causes the make contact of relay 1501 to open momentarily therefore the make contact 1563 of relay 1502 remains closed while the dialing operations are taking place. The make contact 1563 of relay 1502 closes a circuit from battery to the winding of relay 1503 and to ground thereby operating that relay and holding it operated while the calling telephone is standing across relay 1501 with the receiver off of the hook switch.

Relay 1503 performs many supervisory functions in the selector circuit. When normal, break contacts 1582 provided the ground on selector multiple strip 406 by which a calling line equipment unit finds an idle selector. Make contact 1502 provides the battery on selector multiple strip 405 which is part of the circuit holding the calling line equipment locked to the idle selector circuit it had found. Make contact 1588 also places battery on a make contact of relay 1508 which at this time is not operated. This make contact of relay 1503 also places battery on windings of relays 1509 and 1510 thru which it stands on contact lug 1522. It also places battery on a make contact of relay 1513 which operates when a line is found busy and on the make contact 1570 of relay 1509 for subsequent extension into relay 1512.

Make contact 1502 on relay 1503 places battery on a make contact controlled by bar 1533 associated with relay 1512 so that when relay 1512 is once operated it will be held in operation while the calling line is connected. This make contact on relay 1503 also places battery on a make contact of relay 1500 and on selector multiple strip 405 which holds relay 502 of Fig. 5 in operation.

Another make contact 1583 on relay 1503 transmits dial tone to the calling subscriber by connecting dial tone standing on conductor 1567 to the ground side of the talking pair immediately ahead of relay 1501 and thru condenser 1590.

Another make contact 1587 on relay 1503 establishes busy tone on the calling line when required. Busy tone standing on conductor 1566 thru a make contact 1591 on busy test relay 1513 which is now de-energized is carried thru closed make contact 1587 of relay 1503; thru condenser 1590 and to the ground side of the talking pair on the same conductor used by dial tone. Operation of relay 1513 is controlled by a break contact 1572 on relay 1580.

A break contact 1586 on relay 1503 functions when relay 1503 is de-energized on completion of a call and controls the restoration of called line selector equipment to its normal status.

An additional make contact on relay 1503 is in series with a break contact on relay 1501 and the windings of relays 1504 and 1505, therefore when relay 1501 falls back on the 1st dial pulsing circuit break, battery is supplied momentarily thru the closed break contact 1562 of relay 1501; thru the closed make contact 1584 of relay 1503 thru the winding of relay 1504; thru the winding of relay 1505 and to ground, thereby causing relays 1504 and 1505 to operate for the duration of the break after which relays 1501, 1504 and 1505 return to their original status.

When relay 1504 operates, a weighted spring forming part of its contact is caused to vibrate in a raised position and normally will not come to rest on the other spring of the contact until sufficient time has expired for another pulsing action to have taken place therefore if another pulsing operation does occur a fraction of a second after the first one the weighted spring is again lifted and only re-engages the other contact when any series of pulsings has been completed. The contact of relay 1504 is closed whenever that relay is energized or de-energized for a period of time slightly longer than the interval of one dial pulse.

Right now we are only concerned with the one pulse previously mentioned to demonstrate what takes place when a pulsing operation occurs. When relay 1501 was first operated by connection of the calling line its break contact 1562 operated ahead of the contacts on relay 1508 therefore relays 1504 had remained not energized until the dial pulse took place. The contact of relay 1504 has ground standing on it and extending to a make contact on relay 1503 which operated following the operation of relay 1501 therefore this circuit extends thru the winding of relay 1506 to battery and has operated that relay. Relay 1506 remains operated until the first pulsing operation occurs at which time relay 1504 is energized and its contact opens, causing relay 1506 to fall back. As relay 1506 operates with relay 1504 we now have the following mechanical operations completed.

The energizing of relay 1506 attracted its armature 1631, which is pivoted on pin 1632, pushing pawl 1630 into engagement with the first tooth of digit control bar 1625 and placing tension on spring 1633. Spring 1636 is tensioned to impel the end of pawl 1630 toward the digit control bar 1625. During the interval of a dial pulse or of a series of dial pulses the contact on relay 1504 is open therefore with the first pulse, relay 1506 is de-energized and its armature 1631 and associated pawl fall back to their normal positions, the pawl 1630 carrying digit control bar 1625 with it against the tension of spring 1629. When the second tooth of digit control bar 1625 passes a slight projection on holding pawl 1627, this projection falls into position back of the second tooth of bar 1625 thereby holding that bar into its operated position.

When the dial pulse caused relay 1506 to become de-energized, it, at the same time, energized relays 1504 and 1505. Relay 1505 on becoming energized tilts a bar 1610 toward ratchet bars 1640, 1641, 1642 and 1643 and its attached pawls 1611, 1612, 1613 and 1614 are moved accordingly in the same direction. Shading on digit control bar 1625 indicates recesses into which pawls 1611 to 1614 will drop when it is their turn to activate their respective ratchet bars 1640 to 1643. The four pawls 1611 to 1614 move in unison but due to staggering of the recesses but one will engage a ratchet bar at a time. Actually, as shown in Fig. 16, there is but one recess which controls the engagement of the pawls 1611 to 1614 but for the functional diagram Fig. 15 it is necessary to employ four of such recesses in showing the functions in one plane.

As digit control bar 1625 shifts simultaneously with the outward movement of pawls 1611 to 1614 toward the ratchet bars, pawl 1611 will have reached the end of its outward movement at the same time that it drops into the recess in bar 1625 which had been moved into position under it thereby causing its tooth to engage the first tooth of ratchet bar 1640.

When bar 1610 was tilted tension was established in spring 1617. When the period of the dial pulse is completed and relay 1501 is again energized relays 1504 and 1505 are de-energized so the spring tension on bar 1610 restores that bar to its normal position and returns the pawls 1611 to 1614 accordingly. Pawl 1611 being the only one in engagement with a ratchet bar causes ratchet bar 1640 to be moved with the returning pawl. This movement of ratchet bar 1640 places tension on spring 1673 and causes the tooth of holding pawl 1619 to engage the third tooth of ratchet bar 1640 holding the ratchet bar into its operated position.

When the one dial pulse was completed and was not followed by additional pulses developed by the same dialing operation, the contact on relay 1504 closed and relay 1506 again became energized causing pawl 1630 to engage the second tooth of digit control bar 1625.

When ratchet bar 1640 was shifted by the action of one pulse a lift on its upper surface was shifted from under a lift 1650 of a group of supervisory contacts and under a lift 1650 of pattern contact 1 thereby closing that contact.

If reference is made to Figures 16, 18 and 19 it will be noted that the general construction of each group of contacts is the same though there is a variation in the number of contacts in the vertical rows of the group and in the length of the groups. The thousands contact group, associated with ratchet bar 1640 is the longest and the units contact group associated with ratchet bar 1643 is the shortest. The relative length of the contact groups can be seen in Fig. 16. Each vertical row of contacts includes lower retaining spring 1651 and upper retaining spring 1654 which are tensioned to hold notched piece 1655 in position. The ends of these pieces 1655 are slightly smaller in size than the overall cross section elsewhere and fit into holes stamped in the retaining springs 1651 and 1654. The pieces 1655 are made of insulating material notched to support and lift the ends of contact springs 1656 which are individual to the contact. When it is found necessary, to clean or adjust the contact springs of any vertical row pieces 1655 can be lifted out of the retainers 1651 and 1654 to make the contact springs accessible for adjustment. The fixed contact springs 1657 of each horizontal row of contacts, except the supervisory contacts at the end of each group, are common to the entire horizontal row therefore are stamped in one piece as shown in Fig. 20 which is a plan view of a typical stamping 1657. Supporting strips 1660 are also made of insulating material and the terminal end of the contacts are held in place by two machine screws 1661 bushed with insulating material, and threaded into tapped holes in base piece 1601. These machine screws and their associated bushings are not illustrated in Fig. 16 and conform with those illustrated at 301 and 302 of Fig. 4.

We will now return to the functional plan Fig. 15 where in the upper right hand corner two scanning contact lugs 1518 and 1519 are shown. A conductor extends from contact lug 1518 to the common 1657 of the contacts associated with ratchet bar 1640. Ratchet bar 1640 activates the "thousands" group of contacts; ratchet bar 1641 activates the "hundreds" group of contacts; ratchet bar 1642 activates the "tens" group of contacts and ratchet bar 1643 activates the units group of contacts. The numerals 1 to 0 adjacent to the contacts of ratchet bar 1640 indicate which group of a thousand lines that contact will energize when closed. The numerals adjacent to the contacts in the end vertical rows and across the top horizontal row indicate the group of 100 lines each contact could energize when closed. Similar designations are employed in the tens and units groups. In the tens group the numerals adjacent to the contacts indicate which group of ten lines each contact will energize. In the units group the numerals indicate which unit of 100 lines the adjacent contact could energize.

It should be understood that where this invention is employed in the selection of lines in a 10,000 line system each unit to be selected requires a four digit call number, therefore the one dialing pulse we previously introduced has directed selection toward the number one thousand group of lines. Let us now assume that digit one is dialed three more times the complete call number being 1111. On the next dialing operation relay 1501 is de-energized; relays 1504 and 1505 are energized and relay 1506 is de-energized; digit control bar 1625 shifts one step and carries a recess into position under pawl 1612 which at the same time is moving toward ratchet bar 1641. Pawl 1611 is lifted clear of ratchet bar 1640 once more due to the shifting of its associated recess in digit control bar 1625. On completion of the pulsing break, relays 1504 and 1505 are again de-energized and relays 1501 and 1506 are energized once more. Pawl 1612 pulls ratchet bar 1641 over one step and the lift on its upper side disengages from the supervisory contact in group 1576 and moves into position under the 11 to 01 row of hundreds contacts thereby closing the contacts in that row. On dialing the other two digits the operations of relays 1501, 1504, 1505 and 1506 are identical with their previous operations except that the recesses in digit control bar 1625 first permitted pawl 1613 to function and bring ratchet bar 1642 into position with its lift under the contact designated 1 in the tens group and closing that contact. The next dialing operation permitted pawl 1614 only to connect to its ratchet bar 1643 and bring the lift on ratchet bar 1643 under the 11 to 01 row of units contacts causing them to close. The call number 1111 has now been set up, or registered, in the selector equipment and is now ready to be projected into the answering relay 504 of that line's equipment unit of Fig. 5.

When the first or thousands dialing operation closed contact 1 of the row of contacts resting on ratchet bar 1640 it connected the common across the thousands group of contacts to a conductor extending to a common which represents the first thousand in the hundreds contact group associated with ratchet bar 1641 which had closed the first row of contacts in accordance with the second or hundreds dialing operation. We now have established continuity between scanning contact lug 1518, the common of the thousands group of contacts; the common representing the number 1 thousand in the hundreds groups of contacts and the hundred group designated 11. In a 10,000 line system there will be 100 groups of 100 lines. Each of the groups bears one of the designations indicated in the hundreds group of contacts. From each contact in the hundreds group a conductor extends to and is common to the windings of the 100 answering relays 504', Fig. 5, of the 100 line equipment units in that group. For example the 11 contact we have energized has a conductor extending to 100 line equipment units the call number of which starts with the two numerals one-one. Referring to Fig. 5 conductor 532 represents the wire extending from the one-one contact of the hundreds group of contacts in Fig. 15 and conductor 533 represents the common extending to the other 99 relays 504' of the one-one hundreds group.

When ratchet bar 1641 of Fig. 15 closed the 11 to 01 vertical row of contacts the 11 contact only became selected. The remainder of the contacts in the vertical row, though closed in the hundreds group have their associated commons held open at the thousands group of contacts.

We now have established a circuit path extending from scanning contact 1518 of Fig. 15, thru the thousands and hundreds register of the selector to conductor 532 of Fig. 5; thru contacts, such as contacts 574 and 585, to the windings of 100 answering line relays 504' of Fig. 5 due to the thousands and hundreds dialing operations. Now let us start at scanning contact 1519 of Fig. 15 and determine the circuit path established by the tens and units dialing operations. A conductor extends from scanning contact 1519 and establishes continuity from that contact thru a resistance R and the winding of relay 1508; thru contacts 1594 of pulse absorbing relay 1507, to a common 1657 across the 1 to 0 contacts of the group associated with ratchet bar 1642 in which contact 1 is closed, therefore its common in the units group of contacts associated with ratchet bar 1643 is connected. In the units group of contacts vertical row 11 to 01 has all of its contacts closed but continuity from the 1519 scanning contact is established only thru the 11 contact.

In a 10,000 line system there will be 100 call numbers ending with digits one-one. Assume that a conductor extends from the one-one contact in the units group of contacts and is common to the answering relays 504 of all line equipments ending with the digit one-one. A typical illustration of such connection is presented in Fig. 5 where conductor 530 extends thru break contacts 590 to the winding on relay 504 and then thru make contacts 579 to ground. Conductor 531 extends to other line equipment units the call number of which ends with the digits one-one and in which similar connections to the respective relays 504 are established.

We now have completed circuit paths in Fig. 15 from scanning contacts 1518 and scanning contact 1519 thru the answering line pattern selecting network of the registers in the selector. The first two dialing operations in calling number 1111 established continuity to the first hundred of the first thousand answering line relays 504'. The next two dialing operations established continuity to the first unit of the first ten lines in any hundred lines. In the hundred line group identified as one-one there is but one unit which has both the circuits to the answering relays 504 and 504' prepared on completion of the dialing of call number 1111 and that is the one-one unit.

When ground is connected to the 1518 scanning contact of Fig. 15 the following circuit is completed: grounded wiper 1550, scanning contact 1518, common 1657 of the thousands group of contacts, thru the operated thousand contact 1, to the common 1657 of the hundred group, thru the operated hundred contact marked 11, to the thousands and hundreds conductor 532 assigned to the eleven hundred group, thru the contacts, such as contacts 574 and 585, to the windings of relays 504' in this hundred group to battery. All relays 504' in this hundreds group energize and at their contacts 579 connect ground to the winding of their associated 504 relays to prepare their operating circuits only one of which is completed in accordance with the tens and units registration.

When battery is connected to the 1519 scanning contact of Fig. 15 the following circuit is completed for energizing relay 1508 and only one 504 relay in series. Battery flows from wiper 1551, contact 1519 thru resistance R and the winding of relay 1508; thru contact 1594 on pulse absorbing relay 1507; thru the common of the tens group of contacts; thru the contact designated 1 in the tens group and thru its associated common in the units group of contact; thru contact 11 of the units group of contacts; thru a tens and units conductor not shown to Fig. 5; thru common 531 (Fig. 5); thru the tens and units 530 conductor of the line equipment unit 1111; thru break contacts 590 on line relay 501; thru the winding of answering line relay 504; thru make contacts 579 on the associated answering relay 504' to ground. Although all relays 504' having the same thousands and hundreds designations in this eleven hundred groups may be energized over the common thousands and hundred conductor, such as 533, only one relay 504 is energized because only one common tens and units conductor, such as 530, in this hundred group is connected to battery thru scanning wiper 1551. Therefore, relay 504 associated with the line equipment of the line registered in the selector is the only relay 504 which is energized.

With completion of the above described circuits answering relay 504 of Fig. 5 was energized and relay 1508 of Fig. 15 was also energized. The functions of these two relays have previously been described under the heading "Answering operations thru a line equipment unit" so will not be repeated here.

The battery and ground which is employed to activate called lines thru scanning contacts is furnished by a piece of apparatus common to the system which is activated when the dialing operation of the last digit of the call number is started. This unit is called the scanning arm. In operation it carries contact fingers across the 1518 and 1519 scanning contacts. In general the scanning arm is a simplified form of the line equipment unit carrying but two contact fingers, two commutator strips, two brushes and a tripping mechanism. All ratcheting and holding features have been eliminated. The scanning arm is lifted by pressing shaft, extending from the lower end of its operating arm, between a continuously revolving wheel and an idling wheel to which pressure is applied when a lifting action is required.

Contact group 1578, associated with the units contact group, includes a make contact 1597 on which battery is standing. It can be seen that with the first shifting operation of ratchet bar 1643 in establishing the dialed value of a fourth digit the contacts of group 1578 will close due to the shifting of the rise on ratchet bar 1643 which had held the contacts open. Battery now flows from contacts 1597 over a conductor common to all selector circuits, to a break contact 1556 of the tripping mechanism of the scanning arm. This tripping mechanism consists principally of locking springs 1553 and 1554. From contact 1556 battery flows over a conductor extending to the winding of relay 1511, thru that winding and to ground thereby energizing the relay 1511 and causing its associated shaft 1540 to press the idling wheel 1541 against a slightly flexible shaft 1542 which in turn is pressed against constantly revolving wheel 1543 thereby causing shaft 1542 to move upward. Shaft 1542 is attached to a frame similar to that of the line equipment unit illustrated principally in Fig. 9. In Fig. 15 piece 1548 duplicates L-shaped piece 934 of Fig. 9, pin 945 of Fig. 6 duplicated by pin 1545, Fig. 15. Pin 946 in Fig. 9 is duplicated by pin 1555 in Fig. 15. Tripping springs 947 and 948 of Fig. 9 are duplicated by springs 1553 and 1554 of Fig. 15. Commutator strips 1546 and 1547 and associated contact fingers are similar to the commutator strips and contact fingers of Fig. 9. Brushes 1550 and 1551 also duplicate the brushes of Fig. 9.

A pair of scanning contacts 1518 and 1519 are required for each selector circuit of the system. These contacts are similar in construction and assembly to those presented in Figs. 2, 3 and 4. One vertical row of each of the contacts are required. These two rows are in horizontal alignment with the two contact fingers of the scanning arm. If other scanning arms are to be provided for emergency or alternate use it will be necessary to multiple the 1518 and 1519 scanning contacts accordingly.

When a scanning arm reaches its operating limit after having crossed the 1518 and 1519 scanning contacts of each selector circuit the tripping mechanism causes it to return to its normal position and if its operation is still required by a closed 1578 contact in any selector circuit to again start operation. Pin 1545 on reaching the bulge in spring 1554 pushes that spring into engagement with a step on spring 1553 thereby locking the two springs together and opening contact 1556 thereby de-energizing electro-magnet 1511 allowing shaft 1540 to release its pressure on wheel 1541 and shaft 1542. With release of this pressure the scanning arm drops downward until pin 1555 engages the tip of spring 1554 thereby releasing spring 1554 which returns to normal and closes contact 1556.

Battery stands on brush 1551 of the scanning arm and ground stands on brush 1550. This battery and ground are carried to the contact fingers over commutator strips 1546 and 1547. As the scanning fingers engage the 1518 and 1519 scanning contacts of the various selector circuits of the system if dialing has been completed in any of the selector circuits it applies battery and ground thru the selector pattern registered to energize the answering relay 504 of the desired line as previously described.

While a connection is maintained between two telephones or other units employing this system the called line pattern set up in the thousands, hundreds, tens and units groups of contacts remain in their operated positions until the calling telephone or other unit disconnects therefore contact 1578 will hold the scanning arm in operation while any connection is maintained in the system.

In a ten thousand line system the hundreds contacts and the units contacts of the various selector circuits are multipled together. The 100 conductors required by the units group and the 100 conductors required by the hundreds group comprise the total number of conductors required between the line equipments and the selector equipments and between the various selector equipments for the selection of called lines.

It is believed that with the preceding description of selector circuit operations to call number 1111 its operations to any other call number will be understood. If the call number dialed into the selector circuit had been 0000 the rise on each of the four ratchet bars 1640, 1641, 1642 and 1643 of Fig. 15 would have been shifted ten steps thereby closing the right hand vertical row of contacts in each group and establishing a pattern in the selector circuit network to the line equipment unit of line 0000.

In the units group of contacts associated with ratchet bar 1643 a horizontal row of contacts not part of the called number pattern contacts extends across the top of that group as shown in Fig. 15. This row of contacts, together with relay 1507 prevents premature selection and consequent wrong numbers by causing the circuit from scanning contact 1518 to remain open while ratchet bar 1643 is being shifted to its final position. If the call number of a desired line, for example, ends with the digits 50 it will be necessary for the raised section of ratchet bar 1643 to move under and momentarily close the contacts in the other nine vertical rows to reach its final position in the 0 row. Momentarily and in turn all of the line equipment units with call numbers employing 5 for their tens designations will be connected. This however can cause no trouble if the connections are not energized, therefore the circuit from scanning contact 1519 must be held open until ratchet bar 1643 arrives in its final position. Ground on the 1656 springs of the top row of contacts in the units group completes a circuit from battery standing on the winding of relay 1507 so that with each step of ratchet bar 1643 relay 1507 will be alternately energized and de-energized in accordance with the number of vertical rows the raised section of ratchet bar 1643 must pass under to reach its final position. Operation of relay 1507 causes its weighted contact spring to lift and vibrate in a lifted position for a period of time slightly longer than the period of a dial pulse, therefore if a series of pulses are introduced into relay 1507 the vibrating contact spring will remain elevated until the series of pulses has been completed thereby holding open the connections thru that contact accordingly. When ratchet bar 1643 arrives at its final position the circuit thru relay 1507 is closed for the duration of the connection and as the vibration in the weighed contact diminished it too settles back into its closed position even though relay 1507 is energized. A subsequent scanning operation will now energize only the desired line.

*Busy test circuit*

A tap on the conductor between resistance R and the winding of relay 1508 extends thru back contacts 1572 on relay 1580 thru a winding of relay 1513; thru pulse absorbing contact 1593 of relay 1507 thru make contacts 1596 of contact group 1578 to ground. This circuit is only closed thru when a fourth digit dialing operation has shifted the rise on ratchet bar 1643 allowing contact group 1578 to operate and when relay 1507 has closed its contacts 1593. The operations of relay 1507 and its other pulse absorbing contact are described in the preceding paragraph. As both contacts are under the same control and perform the same function of keeping their respective circuits open until dialing has been completed a description of the relay 1507 operations will not be repeated here. When scanning wipers 1550 and 1551 engage the 1518 and 1519 scanning contacts of a selector circuit on which completed dialing is standing, if the line is not busy, battery finds a path from the 1519 scanning contact thru the winding of the answering line relay 504 of the desired line to ground at contacts 579 as previously traced. It will be found that the circuit described above thru the winding of relay 1513 parallels the circuit thru the answering line relay 504 between battery and ground. The combined resistance of relay 1508 of Fig. 15 and an answering line relay 504 of Fig. 5, which are in series when operated, is considerably less than the resistance of the operating winding of relay 1513, therefore if battery is applied to the 1519 scanning contact and continuity is found thru an answering relay 504, relay 1513 being marginal can not obtain sufficient current to operate. When a called line is busy one or both of the conductors 530 and 532 of Fig. 5 are opened in accordance with the status of relays 501, 502 and 504 in the connection and when battery is applied to scanning contact 1519 no current can flow in the branch thru relay 1508 therefore relay 1513 can obtain sufficient current to cause it to operate. When relay 1513 operates ground on one of its windings is closed thru make contact 1592; thru previously closed make contact 1588 on relay 1503 to battery thereby holding relay 1513 in an operated position while the calling line is connected. Another make contact 1591 on relay 1513 carries interrupted busy tone standing on conductor 1566 thru make contact 1587 on relay 1503; thru condenser 1590 to the station side of the grounded winding of relay 1501. The busy tone is thereby conducted thru the calling telephone and the calling subscriber on recognizing the busy tone is expected to disconnect.

Relay 1580 of Fig. 15 is provided to keep busy tone off of an established connection. When relay 1508 operates a called line is also activated therefore the busy test features are no longer required. When relay 1503 operates, battery thru make contacts 1588 and 1574 is connected to ground thru the winding of relay 1580 thereby energizing that relay which operates and locks up thru its make contact to battery furnished thru make contact 1502 on relay 1503 which had previously been operated by the calling line. Operation of relay 1580 opens break contact 1572 in the busy test circuit to the winding of relay 1513 thereby preventing the busy test from operating for the duration of the connection.

*Calling sequence control circuit*

During any busy hour two or more outgoing calls made simultaneously would result in two or more Fig. 5 line equipment units connecting to the same idle selector circuit if the Fig. 5 circuits were used. For clarity in descriptions of the calling and answering functions of relay 501, the calling sequence control features were omitted in Fig. 5. Reference is made to Fig. 7 which indicates the 501 and 502 relays and part of 982 and 938 contact groups of two adjacent line equipment units as wired for this control feature. Additional contacts 541, 542 and 543 are installed in each 938 contact group, additional contacts 544, 545 and 546 are installed on each relay 502 and one additional break contact 539 is added to each 501 relay. In Fig. 7 consider that the 938 contacts and their associated 501 relay at the right have first choice in the cut-in operation. In other words the line equipment unit associated with this 501 relay and 938 contacts will have its ratcheting features set in operation ahead of any line equipment to the left if a choice is necessary. Throughout the system if two or more lines call in at the same instant the right hand unit will have precedence, assuming that the Fig. 7 wiring maintains throughout the system.

Now let it be assumed that the two relays 501 of Fig. 7 have a calling short established across them at the same time. The complete calling circuit of each appears in Fig. 5 between the telephone 510 and the windings of relay 501 but the battery supply to relays 501 is modified in accordance with Fig. 7. The two 501 relays will receive current thru their windings simultaneously but the right hand 501 relay only will remain operated as its break contact 539 cuts off the battery supply to the winding of the left hand 501 relay, thereby causing the left hand 501 relay to fall back. The right hand 501 relay being energized causes the ratcheting operations of its line equipment unit to start thereby lifting its pin 937 which is connected to its ratchet bar 933 and causing its contact group 938 to operate and close and open certain contacts now comprising the group. With the closing of contacts 541 the 938 group of contacts of the right hand line equipment unit, the left hand relay 501 now has battery established thru its winding and that relay, too, can start the ratcheting operations of its line equipment unit. If all relays 501, to the right of a 501 relay being employed in a calling in operation, are either non-operated or fully-operated, the relay 501 being employed in the calling in operation will not be delayed in starting its ratcheting functions.

The break contacts 539 of the 501 relays of the system are wired in series with battery on the right hand contact therefore when any 501 relay operates all 501 relays to its left are denied operating battery until the right hand 501 relay has started its ratcheting operations at which time its contacts 541 in the 938 contact group operates and restores battery to the same series circuit. The initial energizing circuit of relay 501 extends from battery thru break contacts 542, 545 and 982 thru the relay winding and over the calling loop. The contacts 543 close before contacts 542 open to maintain battery on relay 501 while 933 is off normal. The contacts 544 are provided to maintain continuity of the start circuit when the line is called. The contacts 545 and 546 are provided to maintain battery on the winding of relay 501 when this line is a called line so that the initiation of a call by a line having a lower preference choice does not momentarily interrupt the battery feed to the called line. With this circuit arrangement the first choice relay 501 at contacts 539 will open and prevent any other relay 501 from fully energizing and operating its ratcheting apparatus on the initiation of a call until the first choice lineswitch has taken at least one step from normal at which time contacts 541 close to allow another relay 501 to energize and start its lineswitch. A number of lineswitches may be simultaneously hunting for an idle selector but as they are at least one step apart they do not, therefore, simultaneously engage the same selector bank contacts of an idle selector, thereby preventing double seizure of the same idle selector. As soon as relay 502 is energized as a result of the line calling, or being called, contacts 544 close to maintain the continuity of the start circuit while contacts 546 maintain the battery feed to the winding of relay 501 until the release of the connection.

*Answering line grouping circuit*

Where two or more line equipments are to respond to the same call number as in the case of a group of private branch exchange trunks, it will be necessary to modify the Fig. 5 wiring of each line equipment unit involved at the answering relays 504 and 504′ to conform with the wiring presented in Fig. 8. When battery and ground are established across conductors 532 and 530 the relays 504 and 504′ of the right hand or entering line equipment unit will be energized and the locking winding of relay 504 will hold relay 504 in the operated condition for the duration of the connection. In locking up relay 504 at break contacts 574 opens the circuit to its associated relay 504′ and at its left hand make contacts connects conductor 530 to the second 504 relay on the left. At the same time make contact 574 on the same 504 relay completes a path to the winding of the 504′ relay on the left so that if another call is established on the 530 and 532 conductors the middle line equipment unit will respond by operating its 504 and 504′ relays. The middle 504 relay in responding closes the 530 and 532 conductors thru to the third or left hand 504 and 504′ relays. This sequence is continued thru to the number of line equipment units that might be included in the group.

Let it be assumed that the three 504 relays shown in Fig. 8 are energized and that the left hand 504 relay is released first. It then takes its former status across the 530 and 532 conductors. Now let it be assumed that the 504 relays on the right hand end of the group is released. This right hand 504 relay now takes precedence over the left hand 504 relay by breaking the left hand 504 relay's connection with the 530 and 532 conductors.

*Disconnection*

Whenever a calling party disconnects by hanging up his receiver or otherwise breaks the continuity of the line circuit thru the calling telephone or unit all apparatus involved in the connection at that time will be restored to normal. For clarity the restoration control features of the line equipment units are omitted from Fig. 5 but are shown in Fig. 23 the dotted portion of which comprises equipment appearing in Fig. 5, the functions of which have been previously described. In Fig. 23 it can be seen that a make contact is added to calling relay 501; two make contacts are added to contact group 938 and a break contact is added to relay 502.

When a receiver is lifted by a calling line sufficiently long for its associated calling relay 501 to start ratchet operations it is essential that a cycle of calling operations be completed, even though the calling subscriber had disconnected, to prevent the line equipment remaining in an off-normal position. Therefore when a relay 501 is operated it must remain in operation until the contact fingers have found an idle trunk; the holding relay 502 has operated and the ratchet bar 933 has returned to normal. If an idle trunk is not found the cycle will be completed by the action of the tripping mechanism instead.

Referring to Fig. 23 when relay 501 is operated by a calling short, battery thru one of its windings thru a make contact on relay 501; thru a make contact in group 938 which is closed if ratcheting operations have started and ratchet bar 933 and pin 937 have been lifted; thru a break contact on relay 502 and to ground thereby holding relay 501 in operation until relay 502 is operated by finding an idle trunk or by the tripping action both of which have been previously described.

When this disconnection is taking place it is important that the locking relay 502 remain operated until ratchet bar 933 has returned to normal. On a normal connection holding relay 502 remains operated for the full period of the connection once it operates, thereby allowing ratchet bar 933 sufficient time to return to normal before the holding relay 502 is de-energized. However on a premature disconnect this is not true, therefore holding relay 502 must be held in an operated position until ratchet bar 933 returns to normal. The second make contact added to contact group 938 in Fig. 23 places battery thru that contact whenever a ratcheting operation has lifted ratchet bar 933, therefore when holding relay 502 operates this battery flows thru its make contact and one of its windings to ground thereby keeping holding relay 502 in operation until ratchet bar 933 returns to normal and its pin 937 operates the 938 contact group and the battery is cut off.

The Fig. 23 break contact on holding relay 502 removes the holding ground from the battery circuit thru calling relay 501 therefore whenever relay 501 is employed in its answering function this ground is not effective as the holding relay 502 is energized at the same time.

Now let us assume that a connection has been established between two telephones and that the called subscriber was the first to disconnect, thereby de-energizing relay 501 by removing the closed circuit that had been maintained across that relay thru the called telephone 510. Ringing relay 505 and answering relay 504 still remain in their operated status being under the control of holding relay 502 which in turn is held in operation by the calling line. Now referring to Fig. 15 in conjunction with Fig. 5 let it be assumed that the calling subscriber disconnects. The closed circuit he had been maintaining from his telephone at 510 thru break contacts 571 and 573 on the non-operated relay 504 of his line equipment unit; thru make contacts 582 and 584 on operated relay 502 of his line equipment unit; thru brushes 960 and 961, commutator strips 951 and 952, thru contact fingers 987 and 988; thru selector multiple strips 202 and 203; thru the windings of relay 1501 and to battery and ground is opened when his receiver is restored to the switch hook thereby de-energizing relay 1501 and causing it to fall back. When relay 1501 is de-energized it removes battery from the winding of relay 1502 causing that relay to fall back removing battery from the winding of relay 1503. Relay 1503 in falling back removed battery from selector multiple contact strip 405. This battery had been holding locking relay 502 of the calling line's line equipment unit in operation, together with the answering lines locking relay 502 and its answering relay 504 all of which now fall back to their non-operated status. When relay 502 of the answering line falls back its ringing relay 505 has its locking ground removed therefore it too falls back. With release of locking relays 502 on both the calling and answering line equipments the entire inner frame of their line equipment units drop back to their normal status and thereby disengage the respective contact fingers.

In the selector circuit when relay 1503 falls back battery which had been standing on the windings of relays 1512 and 1580 is disconnected therefore pawls 1531 and 1532 of the selector circuits ratcheting shaft 1529 fall back into position in engagement under the upper tooth of ratchet bar 1530. The inner frame of the selector circuits operating arm had returned to normal when relay 1512 operated.

When ratchet bars 1640, 1641, 1642 and 1643 were shifted in establishing the selector pattern of the called numbers, contact groups 1575, 1576, 1577 and 1578 were operated and their respective contacts closed. With the falling back of relay 1503 battery standing on a now closed break contact 1586 of relay 1503 is extended through the windings of relay 1560 and 1561 to ground on the closed contacts 1575 to 1578 thereby energizing relays 1560 and 1561. The armature of relay 1560 is attached to release bar 1672 which engages holding pawls 1619 to 1622 thereby pulling them clear of the teeth of their respective ratchet bars 1640 to 1643 and at the same time lifting operating pawls 1611 to 1614 clear of the teeth in their respective ratchet bars 1640 to 1643. When ratchet bars 1640 to 1643 are operated tension is established in springs 1670 to 1673 therefore when the holding and operating pawls are disengaged from the ratchet bars the ratchet bars snap back to their normal positions where the rise on the top of each ratchet bar 1640 to 1643 open the contacts of contact groups 1575 to 1578 thereby removing the ground from relays 1560 and 1561 and causing those relays to de-energize, shaft 1672 to resume its non-operated position due to the tension of springs 1675 to 1678 impelling the holding pawls to move back to their normal position in engagement with the teeth of their respective ratchet bars 1640 to 1643. Operating pawls 1611 to 1614 now are free to move back to their normal position ahead of the first tooth of their respective ratchet bars 1640 to 1643. Pawls 1611 to 1614 are held under tension against their respective ratchet bars by springs 1679 to 1682.

When relay 1561 was operated its armature being attached to holding pawl 1627 disengages that pawl from the teeth of digit control bar 1625 and at the same time lifts operating pawl 1630 from engagement with the digit control bar 1625. When digit control bar 1625 was shifted due to the action of relay 1506 tension was placed on spring 1629. With the detachment of pawls 1627 and 1630 the tension on spring 1629 causes digit control bar 1625 to return to its normal position.

While the ratchet bars 1640 to 1643 were returning to normal they caused the various vertical rows of contacts to close and open in turn and at the same time ratchet bar 1643 caused relay 1507 to operate as it had when the selection pattern was being established thereby holding open the circuit between contact 1519 and the tens contacts and once more preventing false operation.

With the return of ratchet bar 1643 to its non-operated position and the opening of the contacts in group 1578 battery through contacts 1597 and 1556 of the tripping mechanism to ground through the winding of relay 1511 was disconnected thereby causing that relay to fall back and allow the scanning arm to return to normal if not held in operation by a closed 1578 contact on some other selector circuit.

*Failure indication and alarm circuit*

When the contact fingers 1535 and 1536 of the operating arm of a selector fail to engage contact lugs 1520 and 1521, which are in series with selector multiple strip 204, at the same time the contact finger 989 of an answering line equipment engages that selector multiple strip relay 1509 does not operate therefore relay 1508 remains locked in its operated position. Relay 1503 operated when the calling line connected but 1509 is not operated therefore relay 1512 is not operated so the ratcheting operations continue and carry the contact fingers 1535, 1536 and 1537 upward to contact lug 1522. Ground is standing on contact finger 1537 through commutator strip 1539 and brush 1533. When contact finger 1537 engages contact lug 1522 a circuit is completed from the ground on contact finger 1537; through contact lug 1522; through a winding of relay 1514; through a winding of relay 1509 to battery through make contact 1588 on relay 1503 and causing relays 1509 and 1514 to operate. When relay 1503 operated it released the locked contacts on relay 1508 thereby de-energizing relay 1510 which stopped the ratcheting operations. Relay 1509 also caused relay 1512 to operate by connecting battery to the ground standing on its winding. Operation of relay 1512 caused its bar 1533 to shift and close a make contact on that relay which establishes a path from battery; through make contact 1502 on relay 1503 to ground through the winding of relay 1512 thereby holding that relay operated while the calling subscriber is connected. When bar 1533 shifted, pawls 1531 and 1532 were disengaged from ratchet bar 1530 thereby causing the ratchet bar 1530 to return to normal carrying the whole inner frame of that selector's operating arm to its normal position. When relay 1514 operated, its armature disengaged from signal 1515 causing the end of the signal to drop thereby giving visual indication of the selector which had failed to establish its connection. At the same time relay 1514 locked itself up in the operated position from ground through one of its windings; through one of its make contacts to a closed contact on non-locking key 1517 and to battery. At the same time the closing of the other make contact on relay 1514 placed ground on an alarm bell 1516 on which battery is standing through key 1517 and operated the bell thereby giving an audible indication of the failure of a selector circuit. Relay 1509 was de-energized when contact finger 1537 moved off of contact lug 1522 when operation of relay 1512 caused the inner frame of the selector circuit's operating arm to return to normal. Disconnection by the calling subscriber causes relay 1512 to de-energize; its bar 1533 to shift back to its normal position and pawls 1531 and 1532 to resume engagement with ratchet bar 1530 with their tips resting under its upper tooth. Relay 1514 and bell 1516 are released by momentary manual operation of key 1517.

To better explain the principle employed in this invention to select called lines, Fig. 22 has been included. In Fig. 22 the possible combinations of numerals 1, 2 and 3 with four dialing operations are presented. The number of lines which can be selected are equal to 3 to the 4th power or 81. If the numerals 1 to 5 were used with four dialing operations the possible selections would total 625 or the value of 5 to the fourth power. As the dial in common use in telephony will pulse the value of ten numerals an 81 line system in actual practice would employ but two dialing operations thereby allowing selections totaling to the value of 10 to the 2nd power or 100. However, an initial installation requires but two dialing operations and it is anticipated that the number of lines will ultimately exceed 100 the Fig. 22 practice would be adopted for the initial installation thereby making it unnecessary to change the call numbers of lines involved in the original installation when the system is expanded. To employ an exaggerated illustration, if the Fig. 22 system is expanded from 81 lines to 10,000 lines the numerals 1 to 0 would also be employed in the dialing operations and the original 81 lines would retain the same identity.

It will be noted in Fig. 22 that two conductors 2003 and 2004 enter the network from scanning contacts 1518 and 1519. Conductor 2004 extends to a common across the thousands group of contacts and that if any 1, 2 or 3 contact in the thousands group is closed a common representing that thousand in the hundreds group will be connected. Now if any vertical row of contacts in the hundreds group is closed continuity is established from scanning contact 1518 thru but one 1657 contact in the hundreds group to a conductor extending to the line equipment by the numerals 1111 to 3333 in vertical rows at the right hand side of Fig. 22 in which the wiring of one typical 504 and 504' answering relays are shown at 3333.

Conductor 2003 extends from scanning contact 1519 to a 1657 common in the tens group of contacts where the closing of any of the 1, 2 or 3 contacts will carry the circuit to a common representing that contact in the units group of contacts. The closing of one of the three vertical rows of contacts in the units group of contacts establishes continuity from scanning contact 1519 thru but one 1657 contact in the units group to a conductor extending to the line equipments at the right.

Let it be assumed that the call number 3213 has been dialed. Contact 3 in the thousands group is closed, contacts in vertical row two in the hundreds group are closed and continuity is established between conductors 2004 and conductor 32 thereby connecting one side of the winding of relay 504' of the nine lines of the system which call numbers start with the numeral 32. These nine lines are the 3211, 3221, 3231, 3212, 3222, 3232, 3213, 3223, and 3233 lines. Contact 1 in the tens group is closed, contacts in vertical row 3 in the units group are closed and continuity is established between conductor 2003 and conductor 13 thereby connecting the windings of the 504 relays of the nine lines with call numbers ending in the numeral 13. These nine lines are 1113, 2113, 3113, 1213, 2213, 3213, 1313, 2313 and 3313 lines. While nine 504 relays are connected to the 32 conductor and nine are connected to the 13 conductor there is but one 504 relay that is energized over conductor 13 and that is the 504 relay of the line equipment with call number 3213.

When battery is applied to scanning contact 1519 and ground is applied to scanning contact 1518 the 504 relay on line equipment 3213 operates. A make contact on relay 504 establishes a circuit from the control equipment (not shown in Fig. 22) and thru the other winding of the 504 relay thereby holding that relay operated for the duration of the connection.

Multiple wires 2001 and 2002 extend to similar hundred and units contacts of other selectors.

Figure 21 represents the wiring which would be required for a 10,000 line system. Line 2101 represents the conductor that would connect selector contacts to the hundred group of 504' relays; 2102 the 12 hundred group; 2103 the 13 hundred group; 2104 the 14 hundred group and 2105 the 15 hundred group. Line 2106 represents 95 wires each of which would extend from the selector contacts to a group of 100 of the 504 relays, namely the 16 hundred group to the 00 hundred group. Line 2107 is typical of the 100 units wires extending from selector contacts to the 504 relays. As shown it represents the 11 units conductor but is typical of units conductors 11 to 00. Each conductor will be connected to 100 of the 504 relays.

What is claimed is:

1. In a telephone system, a called subscriber's line, a switch individual to said line, a relay in said switch, a pair of conductors connected to said relay, a trunk line, a calling subscriber's line, means responsive to said calling line initiating a call for connecting said calling line to said trunk line, means including said calling line, said trunk line, and a register for selecting said pair of conductors, means including said register for activating said pair of conductors, means for operating said relay in response to said activation, means responsive to the operation of said relay for operating said switch in a step-by-step operation, and wipers operated by said switch to connect said called line with said trunk line and to complete a connection between said calling and called lines over said trunk line.

2. In a telephone system, a plurality of subscriber lines, a switch individual to each line, a plurality of registers and means including trunk lines for registering the digit designations of a plurality of called lines in said registers, means for sequentially activating said registrations, means responsive to the sequential activation of said registrations for sequentially operating the switches individual to the registered called lines, means in said registers for controlling the operation of said called switches to connect with said trunk lines and complete the desired connections between calling and called lines over said trunk lines, and means whereby the sequential operation of said called individual switches and said last means prevent wrong connections between calling and called lines in case more than one called individual switch are being simultaneously operated to complete their desired connections over said trunk lines.

3. In a telephone system, a plurality of subscriber lines, a switch individual to each subscriber's line, a plurality of registers and means for registering the digit designations in the call numbers of a plurality of called lines in said registers so that the registered digit designations in each register corresponds to a different called line, means common to said registers for sequentially activating said registrations in successive registers, and means responsive to the sequential activation of said registrations for sequentially operating the switches individual to the registered called subscribers' lines.

4. In a telephone system, a plurality of subscriber lines, a switch individual to each subscriber's line, a plurality of registers and means for registering the digit designations in the call numbers of called subscriber lines in said registers, means for sequentially activating said registrations, means responsive to the sequential activation of said registrations for sequentially operating the switches individual to the registered called lines, and means in said registers operated in unison with said called switches for controlling the operation of said called switches.

5. In a telephone system, a plurality of subscriber lines, a switch individual to each subscriber's line, a plurality of registers and means for registering the digit designations in the call numbers of called subscriber lines in said registers, means for sequentially activating said registrations, means responsive to the sequential activation of said registrations for sequentially operating the switches individual to the registered called lines, means in said registers operated in unison with said called switches for controlling the operation of said called switches, and means whereby the sequential operation of said called switches and said register unison operating means prevent wrong connections between calling and called subscriber lines.

6. In a telephone system, a calling subscriber's line and a called subscriber's line, a switch individual to each line, a plurality of registers for registering called subscriber lines, means responsive to the initiation of an outgoing call by said calling line for operating the calling switch individual to the calling line step-by-step in search of an idle register, means for stopping the operation of said calling switch and for connecting the calling line to an idle one of said registers in response to said calling switch finding said one idle register, means for registering the digit designations of said called line in said one register, means controlled by said registration for operating the called switch individual to the registered called line step-by-step in search of the established connection between the calling line and said register, and means for stopping the operation of said called switch and for connecting the called line to said established connection between the calling line and said register thereby completing the desired connection between the calling and called lines.

7. In a telephone system, a plurality of subscriber lines, a switch individual to each subscriber's line, a plurality of registers for registering called subscriber lines, means responsive to the initiation of a plurality of outgoing calls from calling ones of said lines for operating the individual calling line switches step-by-step to select and connect with idle ones of said registers, means for registering the digit designations of a called line in each of said selected ones of said registers; means for sequentially operating the called switches individual to the called lines registered in said selected registers in step-by-step operations, and means associated with each selected register for selectively controlling the extent of step-by-step operations of each called switch individual to the called line registered therein to complete the desired connection between the called line registered therein and the calling line connected thereto.

8. In a telephone system, a called subscriber's line, a switch individual to said line, means including a register for registering the digit designations of said called line on an incoming call to said line, a stopping circuit in said register, means in said register for preparing said stopping circuit in response to said registration in case said line is idle, wipers in said switch having access to said stopping circuit, means in said switch for operating the wipers of said switch in a step-by-step hunting operation to find and connect with said stopping circuit in response to said registration, a selector associated with said register, wipers in said selector having access to said stopping circuit, means for operating the wipers of said selector in a step-by-step operation in unison with said switch wipers, means including said switch wipers and said selector wipers for completing said stopping circuit at one of said unison steps, means in said switch operated in case said stopping circuit is completed for stopping the step-by-step hunting operation of said switch wipers in connection with said stopping circuit, and further means operated in response to the completion of said stopping circuit for stopping the step-by-step operation of said selector in connection with said wipers stopping circuit.

9. In a telephone system, a called subscriber's line, a switch individual to said line, means including a register for registering the digit designation of said called line on an incoming call to said line, a stopping circuit in said register prepared in response to said registration in case said line is idle, said stopping circuit being accessible to said switch, means for starting said switch in a step-by-step hunting operation in search of said stopping circuit in response to said registration, a selector associated with said register and having access to said stopping circuit, means for operating said selector in unison with said switch, connecting means in said selector operated in unison with said switch for completing said stopping circuit in case said switch and said connecting means reach and connect with said stopping circuit in unison, and means in said switch operated in response to the completion of said stopping circuit for stopping the step-by-step hunting operation of said switch.

10. In a telephone system, a calling subscriber's line and a called subscriber's line, a switch individual to said called line, a register for registering the digit designations of called lines, a trunk line terminating said register, means for connecting the calling line to said trunk line and to said register, means for registering the digit designations of said called line in said register, means controlled by said registration for operating the called individual switch step-by-step in search of said trunk line, means in said register operated in search of said trunk line in unison with said called switch, and means operative in response to the called switch and said last means reaching said trunk line in unison for stopping operation of said switch and for completing the connection between the calling and called lines over said trunk line.

11. In a telephone system, a calling subscriber's line, a called subscriber's line, a switch individual to each subscriber's line, a plurality of trunk lines each having a set of multipled terminals accessible to each said switch, means for operating the switch individual to said calling line step-by-step in a hunting operation in search of a set of said terminals of an idle one of said trunk lines in response to the calling line initiating an outgoing call to said called line, means for connecting said calling line to an idle one of said trunk lines in response to said calling switch finding and connecting with one set of said terminals multipled to said one idle trunk line, means for operating the switch individual to said called line step-by-step in a hunting operation in search of another set of said terminals connected in multiple with said one set seized by said calling switch in response to said calling line dialling the digit designations of said called line over said one trunk line, means for connecting said called line to said one trunk line in response to said called switch finding and connecting with another set of said terminals multipled to said one trunk line, thereby completing a connection over said trunk line and said connected terminal sets between said calling and called lines.

12. In a telephone system, a subscriber's line, a switch individual to said subscriber's line, a plurality of trunk lines each having a set of terminals accessible to said switch, and means for operating said switch step-by-step in a hunting operation to select and seize the set of terminals of an idle one of said trunk lines in response to initiating a call outgoing from said line and for operating said switch step-by-step in a hunting operation to select and seize said same set of terminals of said one trunk line to complete a call incoming to said line in response to said one trunk line being used on said incoming call to said line.

13. In a telephone system, a subscriber's line, a switch individual to said subscriber's line, wipers in said switch, a trunk line having a set of terminals accessible to said wipers, means responsive to said subscriber's line initiating an outgoing call for operating said wipers step-by-step to connect with said set of terminals of said trunk line, and means responsive to said subscriber's line being called in an incoming call over said trunk line for operating said wipers step-by-step to connect with said set of terminals of said trunk line to complete the incoming call.

14. In a telephone system, a calling subscriber's line, a called subscriber's line, a switch individual to each subscriber's line, a wiper set for each of said switches, a trunk line having a set of multipled terminals accessible to each wiper set of said individual switches, means for operating the wiper set of the switch individual to said calling line step-by-step to seize one set of said multipled terminals of said trunk line in response to the calling line initiating a call, and means for operating the wiper set of the switch individual to said called line step-by-step to seize the set of multipled terminals of said trunk line accessible to said called switch in response to the calling line dialling the digit designations of said called line over said trunk line to complete a connection between said calling and called lines including said calling and called lines' individual switches, said wiper sets and said multipled terminals of said trunk line.

15. In a telephone system, a calling subscriber's line, a called subscriber's line, a switch individual to each of said subscriber's lines, a line relay in each switch, means for operating the line relay of said calling line in response to the calling line initiating a call for operating its individual calling switch to extend a connection, means responsive to the calling line dialling the digit designations in the call number of said called line for registering such digit designations, a first relay in said called switch corresponding to at least one of the digit designations in the call number of the called line, a second relay in said called switch corresponding to at least another of the digit designations in the call number of the called line, means for operating said first and second relays in response to said registrations, means responsive to the operation of said relays for operating said called switch to complete said connection between the calling and called lines, a source of signalling current in said called switch connected to said called line in response to the completion of said connection, another relay in said called switch responsive to the called subscriber answering for disconnecting said source of signalling current, and means responsive to the operation of said other relay for feeding talking battery through the winding of the line relay in said called switch.

16. In a telephone system, a calling subscriber's line, a called subscriber's line, a switch individual to each of said lines, a line relay in each switch, means for operating the line relay of said calling line in response to the calling line initiating a call for operating its individual calling switch to extend a connection, means responsive to the calling line dialling the digit designations in the call number of said called line for registering such digit designations, a first relay in said called switch having digit designations corresponding to at least one of the digit designations in the call number of the called line, a second relay in said called switch having digit designations corresponding to at least another of the digit designations in the call number of the called line, means for operating said first and second relays in response to said registrations, means responsive to the operation of said relays for operating said called switch to complete said connection between the calling and called lines, and means in said called switch for feeding talking battery through the line relay of said called switch.

17. In a telephone system, a subscriber's line, a switch individual to said line, a line relay in said switch operated in response to the subscriber on said line initiating an outgoing call, means responsive to the operation of said line relay on an outgoing call for operating said switch in a hunting operation, a second relay in said switch operated in response to an incoming call to said line, said means also responsive to the operation of said second relay on an incoming call to said line for operating said switch in a hunting operation, and a third relay in said switch operated on outgoing calls to control the extent of the hunting operations of said switch to extend a connection from said line and operated on incoming calls to control the extent of the hunting operations of said switch to complete a connection to said line.

18. In a telephone system, a subscriber's line, a switch individual to said line, a line relay in said switch operated in response to the subscriber on said line initiating an outgoing call, means responsive to the operation of said line relay on an outgoing call for operating said switch in a hunting operation, a second relay in said switch operated in response to an incoming call to said line, said means also responsive to the operation of said second relay on an incoming call to said line for operating said switch in a hunting operation, a third relay in said switch operated on outgoing calls to control the extent of the hunting operations of said switch to extend a connection from said line and operated on incoming calls to control the extent of the hunting operations of said switch to complete a connection to said line, a source of signalling current in said switch for signalling the subscriber on said line in response to the operation of said second and third relays on an incoming call, and a cut-off relay in said switch for cutting off said signalling current in response to the subscriber on said line answering and for connecting said line relay to said line to feed talking battery thereto.

19. In a telephone system, a calling subscriber's line, a called subscriber's line, a switch individual to the called line, a first relay in said switch having a digit designation corresponding to at least one of the digit designations in the call number of the called line, a second relay in said switch having a digit designation corresponding to at least another of the digit designations in the call number of the called line, a trunk line, means responsive to said calling line initiating a call for connecting said calling line to said trunk line, means responsive to the calling line dialling the digit designations of said called line for operating said first and second relays, and means responsive to the operation of said relays for operating said called switch in search of said trunk line, and means including wipers on said called switch for completing a connection over said trunk line between said calling and called lines in response to said wipers connecting with said trunk line.

20. In a telephone system, a plurality of subscribers' lines divided into a plurality of groups, each said group having digit designations corresponding to a portion of the digit designations of called lines located in such groups, a switch individual to each line and arranged in corresponding groups, a first relay individual to each switch, each said first relay having digit designations corresponding to said portion of the digit designations in the call number of the corresponding line, all the said first relays in each group having the same said portion digit designations, a second relay individual to each line switch, each said second relay having digit designations corresponding to another portion of the digit designations in the call number of the corresponding line, there being only one of said second relays having the same said other portion digit designations in each group, means responsive to a calling line dialling the digit designations of a called line for operating all said second relays having the dialled said other portion digit designations of the called line and for operating only one of said first relays having the dialled said first mentioned portion of digit designations of the called line, and means responsive to the operation of said one first relay for operating the switch individual to the called line to complete a connection between the calling and called lines.

21. In a telephone system, a plurality of subscribers' lines divided into a plurality of groups in accordance with a portion of the digit designations in the call numbers of said lines, a plurality of first conductors, each said first conductor corresponding to at least one of the digit designations in the call numbers of said lines, each said first conductor being individual to one of said groups and normally connected in multiple to all the lines in its group, a plurality of second conductors, each said second conductor corresponding to at least another of the digit designations in the call numbers of said lines, each of said second conductors being common to all said groups and normally connected in multiple to corresponding lines in all the groups having the same said other digit designations in their call numbers, means responsive to a call by a calling line for selecting one of said first conductors and one of said second conductors in accordance with the call number designations of a called line, and means controlled over said selected first and second conductors for completing a connection between the calling and called lines.

22. In a telephone system, a plurality of subscribers' lines divided into a plurality of groups in accordance with a portion of the digit designations in the call number of called lines, a relay individual to each line, a plurality of first conductors, each of said first conductors corresponding to at least one of the digit designations in the call numbers of said lines, each said first conductor being individual to one of said groups and normally connected in multiple to all the said relays in its group, a plurality of second conductors, each said second conductor corresponding to at least another of the digit designations in the call numbers of said lines, each of said second conductors being common to all said groups and normally connected in multiple to corresponding ones of said relays of the corresponding lines in all said groups having the same said other digit designations in their call numbers, means responsive to a call by a calling line for selecting one of said first conductors and one of said second conductors in accordance with the call number designations of a called line, means controlled over said selected first and second conductors for completing an operating circuit for the said relay corresponding to the called line, and means operative in response to the operation of said relay for completing a connection between said calling and called lines.

23. In a telephone system, a plurality of subscribers' lines divided into a plurality of groups in accordance with a portion of the digit designations in the call numbers of called lines, a first and a second relay individual to each line, a circuit for each individual second relay including break contacts on the associated individual first relay, a circuit for each individual first relay including make contacts on the associated individual second relay, a plurality of first conductors, each said first conductor corresponding to at least one of the digit designations in the call numbers of said lines, each said first conductor being individual to one of said groups and normally connected in multiple to all said first relay circuits in its group, a plurality of second conductors, each said second conductor corresponding to at least another of the digit designations in the call numbers of said lines, each said second conductor being common to all said groups and normally connected in multiple to all the said circuits of corresponding second relays of corresponding lines in all said groups having the same said other digit designations in their call numbers, means responsive to a call by a calling line for selecting one of said first conductors and one of said second conductors in accordance with the call number designations of a called line, means for activating said selected second conductor and the multipled relay circuits connected thereto to thereby operate all said second relays of the corresponding lines having the same said other digit designations in their call numbers to prepare certain of said first relay circuits, means for activating said selected first conductor and the multipled relay circuits connected thereto to thereby operate only one of said first relays over one of said prepared circuits in the group corresponding to said selected first conductor, and means responsive to the operation of said first relay for completing a connection between the calling line and the called line corresponding to the said operated first relay.

24. In a telephone system, a calling line, a called line, a switch individual to the called line, a first relay in said switch corresponding to at least one of the digit designations in the call number of the called line, a second relay in said switch corresponding to at least another of the digit designations in the call number of the called line, a circuit for said first relay including contacts on said second relay, means responsive to the calling line dialling the digit designations of said called line for operating said second relay, means responsive to the operation of said second relay for completing said first relay circuit to thereby operate said first relay, and means responsive to the operation of said first relay for opeating said called switch to complete a connection between said calling and called lines.

25. In a telephone system, a plurality of lines, a switch individual to each line, a plurality of registers for registering the digit designations in the call numbers of called lines, a pair of digit designating conductors extending from each individual switch, one of said conductors of each pair corresponding to at least one of the digit designations of a called line, the other of said conductors of each pair corresponding to at least another of the digit designations of a called line, said conductors having similar digit designations being connected in multiple and to said registers, means for operating said registers to select pairs of said digit designating conductors corresponding to the digits in the call numbers of called lines for registering such lines as being called, means for sequentially activating said selected pairs of conductors, and means responsive to the sequential activation of said selected pairs for sequentially operating the corresponding called switches of the called lines registered in said registers.

26. In a telephone system, a plurality of lines, a switch individual to each line, a relay in each switch, a plurality of registers for registering the digit designations in the call numbers of called lines, a pair of digit designating conductors extending from each individual switch and normally connected to its corresponding relay, one of said conductors of each pair corresponding to at least one of the digit designations of a called line, the other conductor of each pair corresponding to at least another of the digit designations of a called line, said conductors having similar digit designations being connected in multiple and to said registers, means for operating said registers to select pairs of said digit designating conductors corresponding to the digits in the call numbers of called lines for registering such lines as called lines, means for activating said selected pairs of conductors in succession, means responsive to said successive activation of said selected pairs for successively operating the relays in said switches connected to said activated pairs of conductors, and means responsive to the operation of each said relay for operating the corresponding called switch of the corresponding lines registered in said registers.

27. In an automatic telephone system, a plurality of lines, a switch individual to each line, a plurality of registers for registering the digit designations of called lines, a pair of digit designating conductors extending from each individual switch, one of said conductors of each pair corresponding to at least one of the digit designations of a called line, the other of said conductors of each pair corresponding to at least another digit designation of a called line, said conductors having similar digit designations being connected in multiple and to said registers, means for operating said registers to select pairs of said digit designating conductors corresponding to the digits in the call numbers of called lines, and means in each switch controlled over said selected pairs of conductors for operating the corresponding switches to complete connections to the corresponding called lines.

28. In a automatic telephone system, a plurality of lines each having four digit designations corresponding to the thousands, hundreds, tens and units digits assigned in the call number of each line, a switch individual to each line, a plurality of registers for registering the four digit designations of called lines, a pair of digit designating conductors extending from each individual switch, one of said conductors of each pair corresponding to the thousands and hundreds digit designations of a called line, the other of said conductors of each pair corresponding to the tens and units digit designations of a called line, said conductors having similar digit designations being connected in multiple and to said registers, means for operating said registers tc select pairs of said digit designating conductors corresponding to the digits in the call numbers of called lines, and means in each switch controlled over said selected pairs of conductors for operating the corresponding switches to complete connections to the corresponding lines.

29. In a telephone system, a subscriber's line, a combined trunk selector and finder switch individual to said line, a set of wipers in said switch, only one kind of trunk lines terminating in fixed contacts in said switch, means for operating said set of wipers of said switch as a trunk selector to select the contacts corresponding to an idle one of said trunk lines or for operating said set of wipers of said switch as a finder to connect with the same said contacts depending upon whether said line is initiating an outgoing call or said line is being called over said one trunk line on an incoming call.

30. In a telephone system, a subscriber's line, an automatic switch individual to said line, means for starting said switch from two different points, a group of trunk lines terminating in fixed contacts in said switch and accessible thereto, and means for operating said switch in response to starting it from one of said points to select the contacts corresponding to the first idle trunk line in said group, and for operating said switch in response to starting it from said other point to pass over the contacts corresponding to idle trunk lines in said group and select the same said contacts of said first trunk line in case said first trunk line is being used in an incoming call to said line.

31. In a telephone system, a called line, a circuit for testing the idle or busy condition of said line, said circuit being in closed circuit condition in case said line is idle and in open circuit condition in case the line is busy, a test relay for controlling the extension of an incoming call to said line, a busy relay connected in multiple with said test relay, means for connecting said test and busy relays to said circuit, said test relay operative in response to said connection only in case said line is idle and said circuit is in closed condition, said busy relay being marginal with respect to said test relay and inoperative in response to said connection in case said line is idle and said circuit is in closed condition, said busy relay being operative in response to said connection in case said line is busy and said circuit is in open circuit condition, and means controlled by the operation of said busy relay for indicating the busy condition of said called line.

32. In a telephone system, a called line, means including a circuit for testing the idle or busy condition of said line when called, a test relay included in said test circuit for determining the idle or busy condition of said line and for controlling the extension of an incoming call to said line, said test relay being operative in case said line is idle and inoperative in case said line is busy, a busy relay connected in multiple with said test relay and to said test circuit, said busy relay being marginal with respect to said test relay and inoperative in case said line is idle and operative in case said line is busy when called to indicate the busy condition of said line.

33. In a telephone system, a subscriber's line, a switch individual to said line, a trunk line accessible to said switch, a first test wiper in said switch for controlling the connection of said switch to said trunk line in case said trunk line is idle on an outgoing call from said line, a pair of test wipers in said switch for controlling the connection of said switch to said trunk line in case said trunk line is being used in the establishment of an incoming call to said line, a pair of wipers in said swtich for completing the talking circuit between the talking conductors of said switch and said trunk line on both outgoing calls and incoming calls for said line, and another wiper in said switch for maintaining the interconnections between said switch and said trunk line until said trunk line is released.

34. In a telephone system, a plurality of lines, a switch having a normal position individual to each line, a call distributing circuit interconnecting said switches for assigning a predetermined successive choice of operation to said switches in response to the origination of simultaneous outgoing calls on corresponding lines, means for operating said switches step-by-step from their normal positions in response to outgoing calls over said lines, means included in said circuit for preventing the simultaneous operation of more than one switch in its initial step from normal position and for delaying the operation of a higher choice switch until after a lower choice switch has completed its initial step from normal position on simultaneous calls, and means included in said circuit for continuing the step-by-step operations of a switch after said switch has completed its initial step from normal position irrespective of any subsequent calls.

35. In a telephone system, a plurality of lines, a switch having a normal position individual to each line, a call distributing circuit interconnecting said switches for assigning a predetermined successive choice of operation to said switches in response to the origination of simultaneous outgoing calls on corresponding lines, means for operating said switches step-by-step from their normal positions in response to outgoing calls over said lines, means included in said circuit for preventing the simultaneous operation of more than one switch in its initial step from normal position and for delaying the operation of a higher choice switch until after a lower choice switch has completed its initial step from normal position on simultaneous calls, means included in said circuit for continuing the step-by-step operations of a switch after said switch has completed its initial step from normal position irrespective of any subsequent calls, and means for maintaining each succeeding operating switch at least one step behind the prior operating switch during the simultaneous operations of a plurality of switches.

36. In a telephone system, a plurality of lines, a switch having a normal position individual to each line, a call distributing circuit interconnecting said switches for assigning a predetermined successive choice of operation to said switches in response to the origination of simultaneous outgoing calls on corresponding lines, means for operating said switches step-by-step from their normal positions in response to outgoing calls over said lines, means included in said circuit for preventing the simultaneous operation of more than one switch in its initial step from normal position and for delaying the operation of a higher choice switch until after a lower choice switch has completed its initial step from normal position on simultaneous calls, means included in said circuit for continuing the step-by-step operations of a switch after said switch has completed its initial step from normal position irrespective of any subsequent calls, means for operating the switch of a called line in response to an incoming call to said line, and means included in said circuit for maintaining the choice continuity of said circuit in case any one of said switches is operated in response to an incoming call to the corresponding line.

37. In a telephone system, a calling line, a switch having a normal position individual to said line, a plurality of trunks accessible to said switch, means for operating said switch step-by-step from normal position in a searching operation to select an idle one of said trunks in response to said line originating an outgoing call, a signal and a register common to said line and other lines, means operative in case said switch fails to select an idle trunk after one complete search over all said trunks for operating said common signal and said common register, means for releasing said switch in response to said failure to cause said switch to repeat its searching operation, and means for insuring full restoration of said switch to its normal position before ing a first electron emitting surface and a second searching operation.

38. In a telephone switch for registering the digits in the call numbers of a pluality of subscribers' lines, a bank of contact spring pairs, each pair corresponding to a tens digit designation and a units digit designation in said call numbers, said pairs arranged in rows with a plurality of said pairs in each row, the pairs in each row having the same unit designation but different tens designations, a series of contact spring pairs corresponding to the different tens digit designations in said call numbers, means connecting each said designated tens digit contact pair in said series to a corresponding tens contact pair in each row in said bank, means responsive to a calling subscriber dialling the tens digit of a called subscriber's number for closing the corresponding tens pair of said contact springs in said series to thereby select a corresponding pair of contact springs in each row of said bank over said connecting means, and means responsive to said calling subscriber dialling the units digit of said called line number for closing said plurality of pairs of contact springs in the corresponding unit row in said bank to thereby select and close the pair of contact springs corresponding to the tens and units digits of said called line.

39. In a telephone switch for registering the digits in the call numbers of a plurality of subscribers' lines, a bank of contact spring pairs, each pair corresponding to a tens digit designation and a units digit designation in said call numbers, said pairs arranged in rows with a plurality of said pairs in each row, the pairs in each row having the same unit designation but different tens designations, a series of contact spring pairs corresponding to the different tens digit designations in said call numbers, means connecting each said designated tens digit contact pair in said series to a corresponding tens contact pair in each row in said bank, means responsive to a calling subscriber dialling the tens digit of a called subscriber's number for closing the corresponding tens pair of said contact springs in said series to thereby select a corresponding pair of contact springs in each row of said bank over said connecting means, means responsive to said calling subscriber dialling the units digit of said called line number for closing said plurality of pairs of contact springs in the corresponding unit row in said bank to thereby select and close the pair of contact springs corresponding to the tens and units digits of said called line, and means individual to the called line controlled over a circuit including said closed tens pair of contact springs in said series, said connecting means, and said closed pair of contact springs corresponding to the tens and units designations of said called line.

40. In a telephone switch for registering the digits in the call number of a plurality of subscribers' lines; a first bank of contact spring pairs, each pair corresponding to a thousands digit designation and a hundreds digit designation in said call numbers, a second bank of contact spring pairs, each said second bank contact pair corresponding to a tens digit designation and a units digit designation in said call numbers, means responsive to a calling subscriber dialling the thousands and hundreds digits of a called subscriber's number for closing the corresponding thousands and hundreds pairs of said contact springs in said first bank means responsive to the calling subscriber dialling the tens and units digits of the called number for closing the corresponding tens and units pairs of said contact springs in said second bank and means individual to the called subscriber's line controlled over circuits including said closed thousands and hundreds pairs of contact springs corresponding to the thousands and hundreds digit designations of said called line in said first bank, said closed tens and units pairs of contact springs corresponding to the tens and units digit designations of said called line in said second bank.

CLARENCE MARBLE.

REFERENCES CITED

The following references are of record in the file of this patent:

UNITED STATES PATENTS

| Number | Name | Date |
|---|---|---|
| 1,569,006 | Deakin | Jan. 12, 1926 |
| 1,705,462 | Gillings | Mar. 12, 1929 |
| 1,799,532 | Ray | Apr. 7, 1931 |
| 1,951,134 | Dixon | Mar. 13, 1934 |
| 2,228,297 | Betulander | Jan. 14, 1941 |
| 2,239,329 | Lindstrom | Aug. 22, 1941 |
| 2,332,878 | Vroom | Oct. 26, 1943 |
| 2,354,660 | Bellamy | Aug. 1, 1944 |